United States Patent
Teddy et al.

(10) Patent No.: US 10,205,744 B2
(45) Date of Patent: *Feb. 12, 2019

(54) REMOTE MALWARE REMEDIATION

(71) Applicant: McAfee, LLC, Santa Clara, CA (US)

(72) Inventors: John D. Teddy, Portland, OR (US);
James Douglas Bean, Tigard, OR (US);
Gregory William Dalcher, Tigard, OR (US);
Jeff Hetzler, Manning, OR (US)

(73) Assignee: McAfee, LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/604,964

(22) Filed: May 25, 2017

(65) Prior Publication Data
US 2018/0083983 A1  Mar. 22, 2018

Related U.S. Application Data

(63) Continuation of application No. 14/853,870, filed on Sep. 14, 2015, now Pat. No. 9,667,648, which is a
(Continued)

(51) Int. Cl.
*G06F 21/56* (2013.01)
*H04L 29/06* (2006.01)

(52) U.S. Cl.
CPC .......... *H04L 63/145* (2013.01); *G06F 21/56* (2013.01); *G06F 21/566* (2013.01); *H04L 63/1416* (2013.01); *G06F 2221/2115* (2013.01)

(58) Field of Classification Search
CPC ... H04L 63/145; H04L 63/1416; G06F 21/56; G06F 21/566; G06F 2221/2115
(Continued)

(56) References Cited

U.S. PATENT DOCUMENTS 5,960,170 A  9/1999  Chen et al.
5,987,610 A  11/1999  Franczek et al.
(Continued)

FOREIGN PATENT DOCUMENTS

| WO | 2014142986 A1 | 9/2014 |
| WO | 2014143000 A1 | 9/2014 |
| WO | 2014143012 A1 | 9/2014 |

OTHER PUBLICATIONS

Final Office Action in U.S. Appl. No. 13/976,988 dated Apr. 11, 2016, 28 pages.
(Continued)

*Primary Examiner* — Kambiz Zand
*Assistant Examiner* — Benjamin A Kaplan
(74) *Attorney, Agent, or Firm* — Patent Capital Group

(57) ABSTRACT

An opportunity to assist with remediation of a file at a remote particular host device is identified. One or more remediation techniques are identified that can be applied to assist with remediation of the file at the particular host device. In one aspect, one or more remediation scripts are identified from a plurality of remediation scripts for remediation of the file and provided to the particular host device for execution on the particular host device. In another aspect, a remediation tool is identified and launched on a computing device remote from the particular host device with operations of the remediation tool applied to resources of the particular host device. In another aspect, at least a portion of the remediation techniques are remotely initiated to be performed locally at the particular host device.

22 Claims, 11 Drawing Sheets

Related U.S. Application Data continuation of application No. 13/977,003, filed as application No. PCT/US2013/032322 on Mar. 15, 2013, now Pat. No. 9,143,519.

(58) Field of Classification Search
USPC .......................................................... 726/23
See application file for complete search history.

(56) References Cited

U.S. PATENT DOCUMENTS

| | | | |
|---|---|---|---|
| 6,073,142 | A | 6/2000 | Geiger et al. |
| 6,092,194 | A | 7/2000 | Touboul |
| 6,460,050 | B1 | 10/2002 | Pace et al. |
| 7,506,155 | B1 | 3/2009 | Stewart et al. |
| 8,078,707 | B1 | 12/2011 | Watsen et al. |
| 8,312,539 | B1 | 11/2012 | Nachenberg et al. |
| 8,402,543 | B1 | 3/2013 | Ranjan et al. |
| 8,443,449 | B1 | 5/2013 | Fan et al. |
| 8,510,836 | B1 | 8/2013 | Nachenberg |
| 8,627,469 | B1 | 1/2014 | Chen et al. |
| 9,053,146 | B1 | 6/2015 | Kapoor et al. |
| 9,143,519 | B2 | 9/2015 | Teddy et al. |
| 9,311,480 | B2 | 4/2016 | Teddy et al. |
| 9,614,865 | B2 | 4/2017 | Teddy et al. |
| 9,667,648 | B2 | 5/2017 | Teddy et al. |
| 2002/0154268 | A1 | 10/2002 | Noto et al. |
| 2002/0154628 | A1 | 10/2002 | Akasaka et al. |
| 2004/0117640 | A1 | 6/2004 | Chu et al. |
| 2004/0128355 | A1 | 7/2004 | Chao et al. |
| 2005/0182958 | A1 | 8/2005 | Pham et al. |
| 2006/0179484 | A1 | 8/2006 | Scrimsher et al. |
| 2006/0272014 | A1 | 11/2006 | McRae et al. |
| 2007/0143827 | A1 | 6/2007 | Nicodemus et al. |
| 2007/0143851 | A1 | 6/2007 | Nicodemus et al. |
| 2008/0022384 | A1 | 1/2008 | Yee et al. |
| 2008/0028010 | A1 | 1/2008 | Ramsey |
| 2008/0040510 | A1 | 2/2008 | Warner et al. |
| 2008/0282347 | A1 | 11/2008 | Dadhia et al. |
| 2008/0289021 | A1 | 11/2008 | Chandrasekhar et al. |
| 2009/0007102 | A1 | 1/2009 | Dadhia et al. |
| 2009/0063371 | A1 | 3/2009 | Lin |
| 2009/0177514 | A1 | 7/2009 | Hudis et al. |
| 2009/0281981 | A1 | 11/2009 | Chen et al. |
| 2009/0328209 | A1 | 12/2009 | Nachenberg |
| 2010/0037314 | A1 | 2/2010 | Perdisci et al. |
| 2011/0038259 | A1 | 2/2011 | Bharrat et al. |
| 2011/0067101 | A1 | 3/2011 | Seshadri et al. |
| 2011/0162070 | A1 | 6/2011 | Krasser et al. |
| 2011/0167328 | A1 | 7/2011 | Iverson |
| 2012/0023583 | A1 | 1/2012 | Sallam |
| 2012/0066759 | A1 | 3/2012 | Chen et al. |
| 2012/0084859 | A1 | 4/2012 | Radinsky et al. |
| 2012/0102569 | A1 | 4/2012 | Turbin |
| 2012/0240229 | A1 | 9/2012 | Sobel et al. |
| 2012/0317644 | A1 | 12/2012 | Kumar et al. |
| 2013/0061325 | A1 | 3/2013 | Singh et al. |
| 2013/0142427 | A1 | 6/2013 | Fagg et al. |
| 2013/0152201 | A1 | 6/2013 | Gullotto et al. |
| 2013/0198800 | A1 | 8/2013 | Bezilla et al. |
| 2014/0109170 | A1 | 4/2014 | Nemiroff et al. |
| 2014/0283065 | A1 | 9/2014 | Teddy et al. |
| 2014/0283066 | A1 | 9/2014 | Teddy et al. |
| 2014/0289853 | A1 | 9/2014 | Teddy et al. |
| 2015/0193695 | A1 | 7/2015 | Mota et al. |
| 2016/0006751 | A1 | 1/2016 | Teddy et al. |
| 2017/0366560 | A1 | 12/2017 | Teddy et al. |

OTHER PUBLICATIONS

Final Office Action in U.S. Appl. No. 13/976,988 dated May 5, 2015, 26 pages.
Final Office Action in U.S. Appl. No. 13/976,994 dated Jul. 28, 2015 4 pages.
Final Office Action in U.S. Appl. No. 14/853,870 dated Sep. 6, 2016, 7 pages.
Non Final Office Action in U.S. Appl. No. 13/976,988 dated Aug. 31, 2015, 27 pages.
Non Final Office Action in U.S. Appl. No. 13/976,988 dated Sep. 12, 2014, 22 pages.
Non Final Office Action in U.S. Appl. No. 13/976,994 dated Jul. 8, 2014, 14 pages.
Non Final Office Action in U.S. Appl. No. 14/853,870 dated Apr. 18, 2016, 27 pages.
Non Final Office Action in U.S. Appl. No. 13/976,988 dated Aug. 31, 2015.
Non Final Office Action in U.S. Appl. No. 13/976,994 dated Mar. 13, 2015.
Non Final Office Action in U.S. Appl. No. 13/977,003 dated Jan. 22, 2015.
Non-Final Office Action in U.S. Appl. No. 13/976,994 dated Sep. 12, 2014.
Non-Final Office Action in U.S. Appl. No. 13/977,003 dated Jan. 22, 2015, 28 pages.
Non-Final Office Action in U.S. Appl. No. 13/976,988 dated Sep. 12, 2014.
Notice of Allowance in U.S. Appl. No. 13/976,988 dated Nov. 30, 2016, 14 pages.
Notice of Allowance in U.S. Appl. No. 13/976,994 dated Nov. 30, 2015, 7 pages.
Notice of Allowance in U.S. Appl. No. 13/977,003 dated Aug. 28, 2015, 4 pages.
Notice of Allowance in U.S. Appl. No. 14/853,870 dated Jan. 26, 2017, 7 pages.
Notice of Allowance in U.S. Appl. No. 13/977,003 dated Jan. 22, 2015.
Notice of Allowance in U.S. Appl. No. 13/977,003 dated Aug. 12, 2015.
Notice of Allowance in U.S. Appl. No. 13/977,003 dated Aug. 28, 2015.
Notice of Allowance in U.S. Appl. No. 13/977,003 dated May 11, 2015.
PCT International Application No. PCT/US2013/032186, entitled Server-Assisted Anti-Malware Client, filed Mar. 15, 2013.
PCT International Application No. PCT/US2013/032322, entitled Remote Malware Remediation, filed Mar. 15, 2013.
PCT International Application Serial No. PCT/US2013/032186, entitled Server-Assisted Anti-Malware Client, filed on Mar. 15, 2013.
PCT International Application Serial No. PCT/US2013/032275 entitled Server-Assisted Anti-Malware Client, filed on Mar. 15, 2013.
PCT International Application Serial No. PCT/US2013/032322 entitled Remote Malware Remediation, filed on Mar. 15, 2013.
PCT International Preliminary Report in Patentability in Patent Application Serial No. PCT/US2013/032186, dated Sep. 15, 2015.
PCT International Preliminary Report in Patentability in Patent Application Serial No. PCT/US2013/032275, dated Sep. 15, 2015.
PCT International Preliminary Report in Patentability in Patent Application Serial No. PCT/US2013/032322 dated Sep. 15, 2015.
PCT International Preliminary Report on Patentability in PCT International Application Serial No. PCT/US2013/032186 dated Sep. 15, 2015.
PCT International Preliminary Report on Patentability in PCT International Application Serial No. PCT/US2013/032275 dated Sep. 15, 2015.
PCT International Preliminary Report on Patentability in PCT International Application Serial No. PCT/US2013/032322 dated Sep. 15, 2015.
PCT International Search Report and Written Opinion received for Patent Application No. PCT/US2013/032186, dated Dec. 19, 2013.
PCT International Search Report and Written Opinion received for Patent Application No. PCT/US2013/032275 dated Dec. 19, 2013.
PCT International Search Report and Written Opinion received for Patent Application No. PCT/US2013/032275, dated Dec. 26, 2013.
PCT International Search Report and Written Opinion received for Patent Application No. PCT/US2013/032322, dated Dec. 19, 2013.

(56) References Cited

OTHER PUBLICATIONS

PCT International Search Report and Written Opinion received for Patent Application Serial No. PCT/US2013/032186, dated Dec. 19, 2013 2013.
PCT International Search Report and Written Opinion received for Patent Application Serial No. PCT/US2013/032275, dated Dec. 26, 2013 2013.
PCT International Search Report and Written Opinion received for Patent Application No. PCT/US2013/032322, dated Dec. 18, 2013 2013.
PCT International Search Report and Written Opinion received for PCT Patent Application No. PCT/US2013/032322 , dated Dec. 18, 2013.
371 U.S. Appl. No. 13/977,003, entitled Remote Malware Remediation, filed Jun. 27, 2013, naming inventors John Teddy et al.
371 U.S. Appl. No. 13/976,988 entitled Server-Assisted Anti-Malware Client, filed Jun. 27, 2013, naming inventors John Teddy et al.
371 U.S. Appl. No. 13/976,994 entitled Server-Assisted Anti-Malware Client, filed Aug. 28, 2013, naming inventors John Teddy et al.
371 U.S. Appl. No. 13/976,994 entitled Server-Assisted Anti-Malware Client, filed Aug. 28, 2013, naming inventors John D. Teddy et al.
Non Final Office Action in U.S. Appl. No. 15/477,338 dated Feb. 27, 2018, 21 pages.
Final office Action in U.S. Appl. No. 15/477,338 dated Aug. 29, 2018, 21 pages.

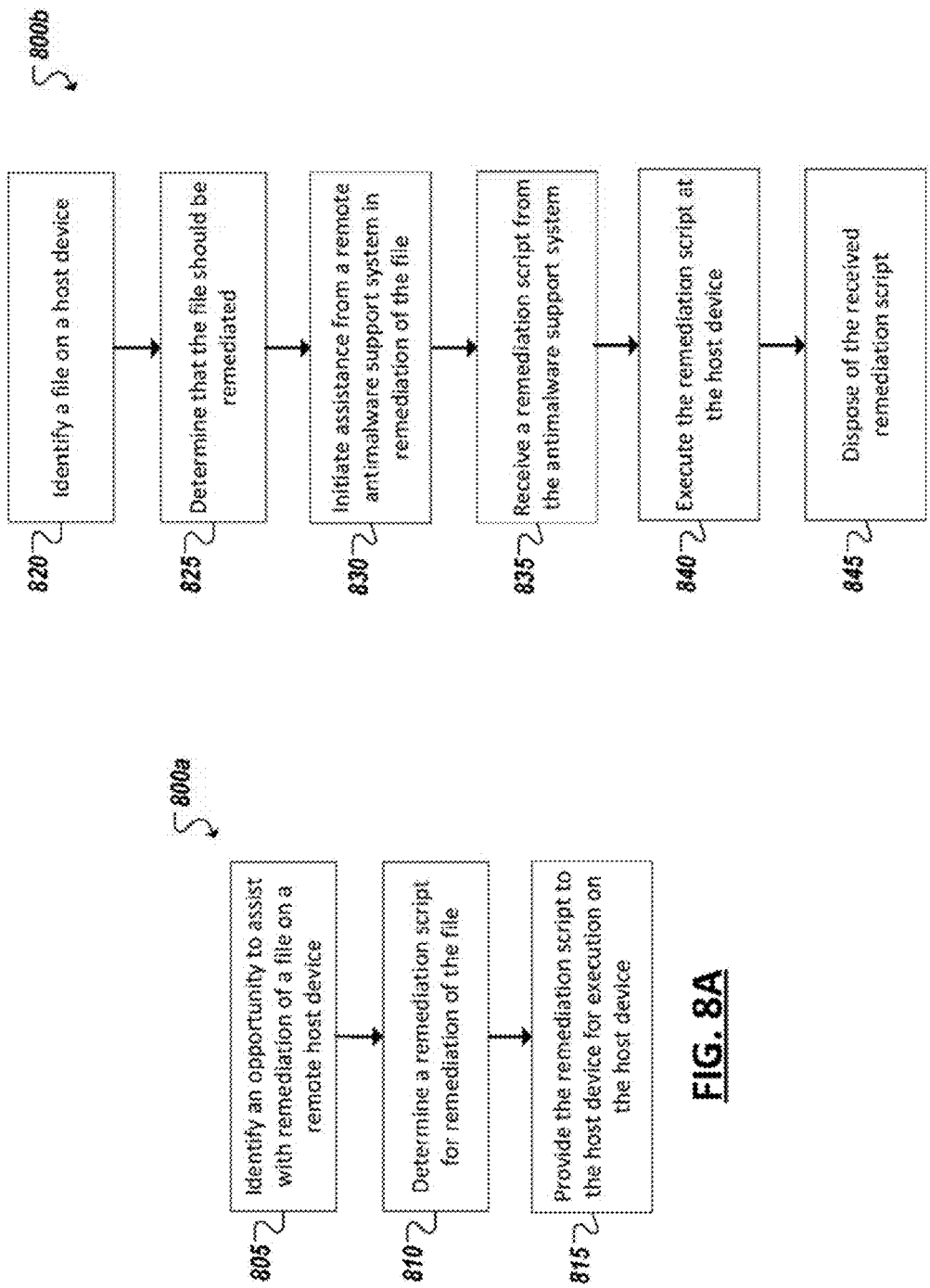

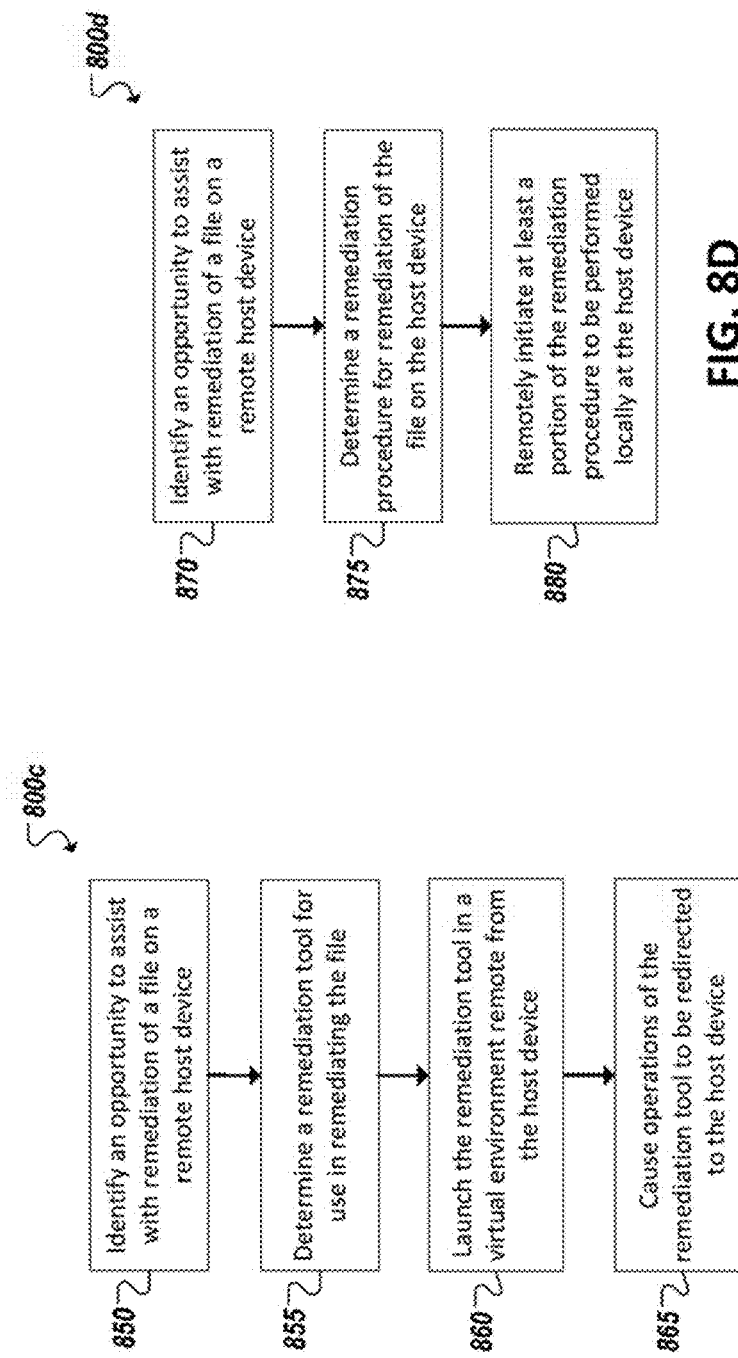

REMOTE MALWARE REMEDIATION

RELATED APPLICATIONS

This application is a continuation (and claims the benefit of priority under 35 U.S.C. § 120) of U.S. patent application Ser. No. 14/853,870 filed Sep. 14, 2015, and entitled REMOTE MALWARE REMEDIATION, which is a continuation of U.S. patent application Ser. No. 13/977,003 with a U.S. 371 fling date of Jun. 27, 2013 and an effective filing date of Mar. 15, 2013, and entitled REMOTE MALWARE REMEDIATION, now U.S. Pat. No. 9,143,519 issued Sep. 22, 2015, which application is a national stage application under 35 U.S.C. § 371 of PCT International Application Serial No. PCT/US2013/032322, filed on Mar. 15, 2013. The disclosures of the prior Applications are considered part of and are incorporated by reference in the disclosure of this Application. The present Application is also related to PCT International Patent Application Serial No. PCT/US2013/032186, filed Mar. 15, 2013, and PCT International Patent Application Serial No. PCT/US2013/032275, filed Mar. 15, 2013, both of which are hereby incorporated by reference in their entirety as if originally and explicitly set forth herein.

TECHNICAL FIELD

This disclosure relates in general to the field of computer security and, more particularly, to malware detection and remediation.

BACKGROUND

The Internet has enabled interconnection of different computer networks all over the world. The ability to effectively protect and maintain stable computers and systems, however, presents a significant obstacle for component manufacturers, system designers, and network operators. Indeed, each day thousands of new threats, vulnerabilities, and malware are identified that have the potential of damaging and compromising the security of computer systems throughout the world. Antivirus, antispyware, and other antimalware products and solutions have been developed. Some traditional antimalware products employ a host-centric approach in which the bulk of the functionality of the antimalware tool is installed onto the host, with the antimalware tool occasionally downloading an update of remediation tools, virus definition files, and other content to keep the antimalware tool abreast of newly discovered malware and other developments. The antimalware tool can then screen objects, processes, downloads, and other events on the host machine to determine whether malware exists on the host, per the content received from the updater, as well as attempt to remediate the malware using functionality available at the host-based antimalware tool. In some cases, the host-based antimalware tool can further attempt to remediate any malware discovered on the host by attempting, for instance, to quarantine or remove the file from the host.

BRIEF DESCRIPTION OF THE DRAWINGS

FIGS. 8A-8D are flowcharts representing example techniques involving an example antimalware support system in accordance with at least some embodiments;

DETAILED DESCRIPTION OF EXAMPLE EMBODIMENTS

Figure 1:
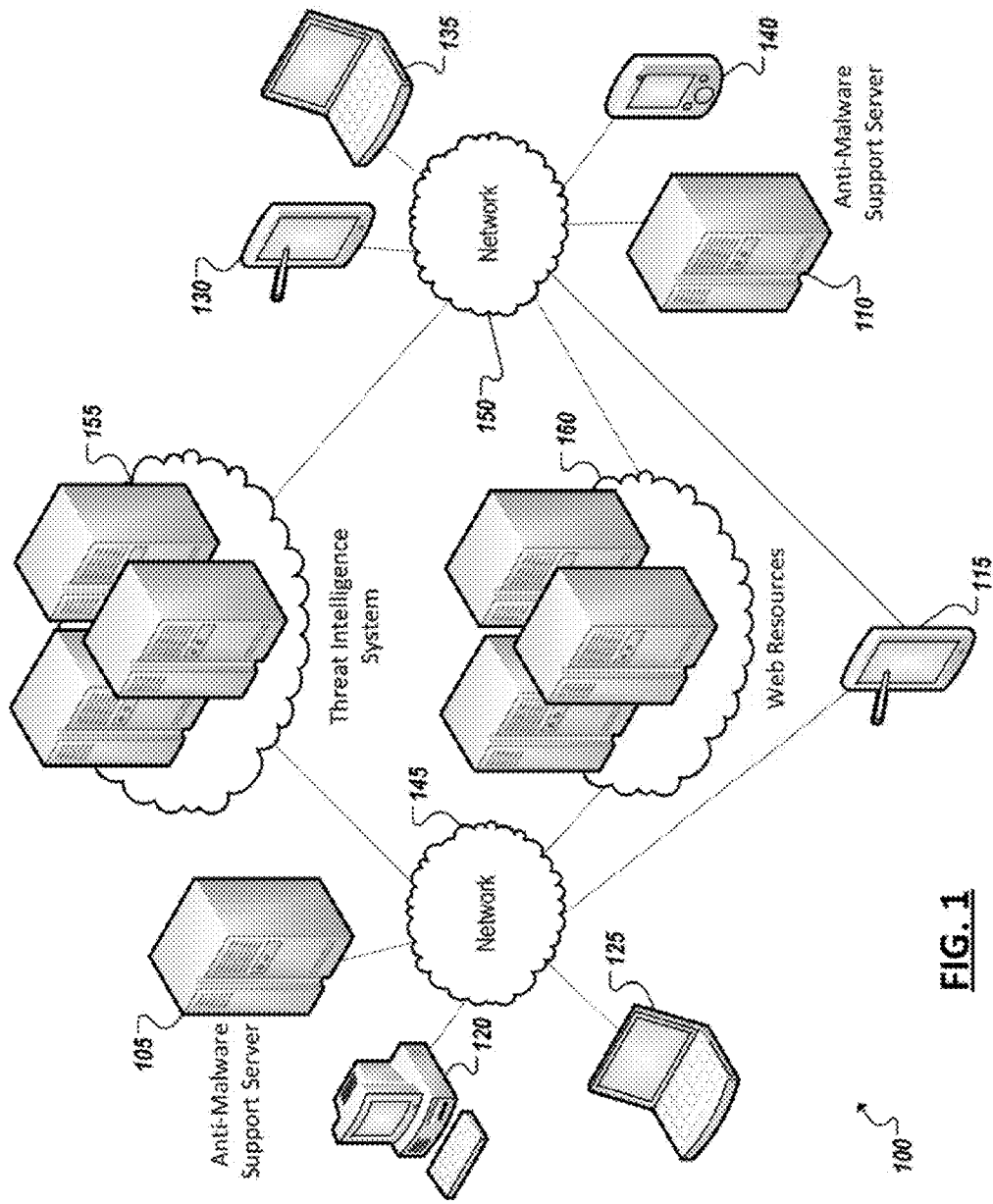
FIG. 1 is a simplified schematic diagram of an example system including an antimalware support system in accordance with one embodiment.

FIG. 1 is a simplified block diagram illustrating an example embodiment of a computing environment 100 including one or more anti-malware support system servers 105, 110 assisting antimalware clients installed on host computing devices (or "hosts") (e.g., 115, 120, 125, 130, 135, 140, etc.). An antimalware support system (e.g., 105, 110) can be associated with a particular computing domain or network (e.g., 145, 150), such as an enterprise network, university network, cellular data network, private local area network, and so on. Hosts can communicate using a particular domain's network (e.g., 145, 150) and can be associated with one or more distinct environments. Indeed, in some examples, a single host device (e.g., 115) can alternatively (or even, in some cases concurrently) access, communicate over, be resident in, or otherwise utilize multiple networks (e.g., 145, 150) of multiple environments.

In some implementations, a particular domain may have one or more dedicated antimalware support servers (e.g., 105, 110) hosting an antimalware support system configured to provide support to and operate cooperatively with antimalware clients installed on the hosts of the respective domain. In some implementations, an antimalware support system can be configured to interoperate with multiple different versions or types of antimalware clients hosted by a variety of different host devices (e.g., 115, 120, 125, 130, 135, 140). An antimalware support system (e.g., 105, 110) can be dedicated to its particular domain and can be configurable, for instance, by an administrator of the domain, to provide customized anti-malware support consistent with one or more domain-specific rules, policies, characteristics, or definitions.

In some implementations, each instance of a domain-specific antimalware support system (e.g., 105, 110) can further interface with a threat intelligence system 155 maintaining records for and detecting system threats across multiple domains. In one example, a threat intelligence system 155 can utilize data from a variety of different sensors and security tools deployed across multiple different domains, networks, and computing devices, including various types of networks and computing device to develop reputation and threat data that can be provided to other systems. A threat intelligence system 155 can, for example, correlate threat intelligence from files, web-based resources, messaging, email, networks, etc., to generate alerts and reputation updates for various threats and malware as they are detected. For instance, a threat intelligence system 155 can be utilized to collect intelligence regarding the billions of files and objects made available over the Internet by web-based sources (e.g., 160) and other actors, intelligence that could otherwise be prohibitively difficult for a single entity to collect in light of the other business and non-profit objectives, etc. of the entity, among other examples.

In some examples, a threat intelligence system 155 can gather and correlate data from, in some cases, millions of sensors gathering real-world threat information, correlate the collected data, and deliver reputation-based threat intelligence that can be consumed by sensors and security tools potentially throughout the world, including by antimalware support systems 105, 110. In some instances, various security vendors and other entities can provide separate threat intelligence feeds as services implemented using a respective threat intelligence system (e.g., 155). In some examples, an antimalware support system (e.g., 105, 110) can consume threat intelligence and reputation information developed and served by multiple different threat intelligence systems 155 and further correlate, supplement, and process the various threat intelligence data for an even more comprehensive look at the malware, malicious websites, malicious events and entities discovered by other systems potentially throughout the world (e.g., as provided to threat intelligence systems (e.g., 155) by deployed sensors and security tools, etc.).

An antimalware support system 105, 110 can include substantially comprehensive functionality for assessing, scanning, identifying, and remediating known malware. At least some of the functionality and/or content used by antimalware support systems 105, 110 to deliver this functionality, can be provided through one or more threat intelligence systems (e.g., 155) in communication with the antimalware support systems 105, 110. Threat intelligence received through threat intelligence systems (e.g., 155) can be further supplemented, modified, or filtered according to domain-specific definitions, policies, and rules defined at a respective antimalware support system (e.g., 105, 110). Further, given the robust (and in some cases, domain-specific) antimalware functionality available at an antimalware support system (e.g., 105, 110), robust antimalware tools and content supporting the functionality of such tools can be paired down substantially at the host device level. Indeed, in some examples, an antimalware client installed on the host device (e.g., 115, 120, 125, 130, 135, 140) can be "thin" in that it provides minimal functionality at the antimalware client independent of the antimalware support system (e.g., 105, 110) with which it operates. In some instances, an antimalware support system (e.g., 105, 110) can handle antimalware scans, assessments, and remediation that are beyond the capabilities of the host-based, thin antimalware clients on host devices supported by the antimalware support system (e.g., 105, 110). Further, requests, queries, and other data communicated by distributed antimalware clients can be used by antimalware support systems 105, 110 to develop cumulative and crowd-sourced intelligence concerning the particular domain served by the antimalware support system 105, 110. The antimalware support system 105, 110 can utilize such intelligence to further customize its responses within the domain, tailor how it utilized threat intelligence from other sources (e.g., threat intelligence system 155) outside of its domain, and offer administrators within the domain valuable information that can be utilized to further fine-tune and define domain-specific rules, policies, and reputation algorithms, among other examples.

In general, "servers," "devices," "computing devices," "host devices," "end user devices," "clients," "endpoints," "computers," "systems," etc. (e.g., 105, 110, 115, 120, 125, 130, 135, 140, 155, etc.) can include electronic computing devices operable to receive, transmit, process, store, or manage data and information associated with the software system 100. As used in this document, the term "computer," "computing device," "processor," or "processing device" is intended to encompass any suitable processing device adapted to perform computing tasks consistent with the execution of computer-readable instructions. Further, any, all, or some of the computing devices may be adapted to execute any operating system, including Linux, UNIX, Windows Server, etc., as well as virtual machines adapted to virtualize execution of a particular operating system, including customized and proprietary operating systems.

Host devices (e.g., 115, 120, 125, 130, 135, 140) can further computing devices implemented as one or more local and/or remote client or end user devices, such as personal computers, laptops, smartphones, tablet computers, personal digital assistants, media clients, web-enabled televisions, telepresence systems, gaming systems, multimedia servers, set top boxes, smart appliances, in-vehicle computing systems, and other devices adapted to receive, view, compose, send, or otherwise interact with, access, manipulate, consume, or otherwise use applications, programs, and services served or provided through servers within or outside the respective device (or environment 100). A host device can include any computing device operable to connect or communicate at least with servers, other host devices, networks, and/or other devices using a wireline or wireless connection. A host device, in some instances, can further include at least one graphical display device and user interfaces, including touchscreen displays, allowing a user to view and interact with graphical user interfaces of applications, tools, services, and other software of provided in environment 100. It will be understood that there may be any number of host devices associated with environment 100, as well as any number of host devices external to environment 100. Further, the term "host device," "client," "end user device," "endpoint device," and "user" may be used interchangeably as appropriate without departing from the scope of this disclosure. Moreover, while each end user device may be described in terms of being used by one user, this disclosure contemplates that many users may use one computer or that one user may use multiple computers, among other examples.

While FIG. 1 is described as containing or being associated with a plurality of elements, not all elements illustrated within system 100 of FIG. 1 may be utilized in each alternative implementation of the present disclosure. Additionally, one or more of the elements described herein may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Malware is in a constant state of development and evolution. One of the greatest challenges facing antimalware vendors and their systems is the corresponding struggle of identifying new malware as early as possible and developing mechanisms for remediating the malware before its damage is widespread. This is particularly difficult given the awesome (and ever-expanding) volume and variety of malware variations. Traditional antimalware and other security solutions have relied upon databases of malware definitions that can be used to store and organize the content utilized by traditional antimalware solutions to attempt to keep pace with new developments and identify and remediate malware on a host device. Traditionally, databases have been used to store malware definitions and other content depended on by antimalware tools, with such databases and antimalware tools hosted locally on the host device protected by the antimalware tools. As new malware is discovered, the database is to be updated so that the host-based-antimalware tool is not using stale malware definitions and potentially missing new and active malware potentially threatening the host device (and with it, potentially other host devices and domains in communication with the infected host device).

In some cases, traditional systems update their definitions daily with additional content uploaded by a server. In some environments, each time a host device is started or restarted, new definitions are uploaded to update the host device's antimalware tools. In some cases, these new definitions can include large amounts of data taking potentially several minutes to upload, depending, for instance, on the processing power of the host device, the bandwidth of the network used, among other factors. Additionally, a common complaint of traditional antimalware systems is that their presence degrades the overall performance of the host device, given the large amount of processing and data overhead utilized by antimalware tools. This can be an unfortunate and ironic result for users employing antimalware solutions with the hope that such tools will protect their machines from malware that threatens to impede or damage the performance of their machine.

Additionally, as the paradigm within computing continues to shift from desktop computers to mobile computing devices, providing malware detection on mobile and embedded devices can present additional and unique challenges. While the capabilities of such devices have increased (as their dimensions decrease), resources can still be limited compared to more robust desktop and server environments. Additionally, these devices have, in many instances, been developed to support quickly returning to full operation following an extended hibernation and consumers have, in many instances, come to expect such at-a-moments-notice availability from their device. Such expectations and designs, however, can preclude lengthy antimalware content updates upon restart as has become commonplace with many traditional security solutions. Additionally, the comparatively streamlined processing power of mobile computing devices makes the deployment of resource-heavy antimalware solutions potentially even more problematic and burdensome than with traditional desktop and server-based systems and device. Even on robust traditional devices, in some instances, traditional antimalware solutions can rely upon databases of malware definition files and other content to recognize and remediate malware that push the limits of what can be supported on many host devices. Other issues and challenges also exist beyond the above examples with respect to traditional tools and solutions for detection and remediation of malware.

Figure 2:
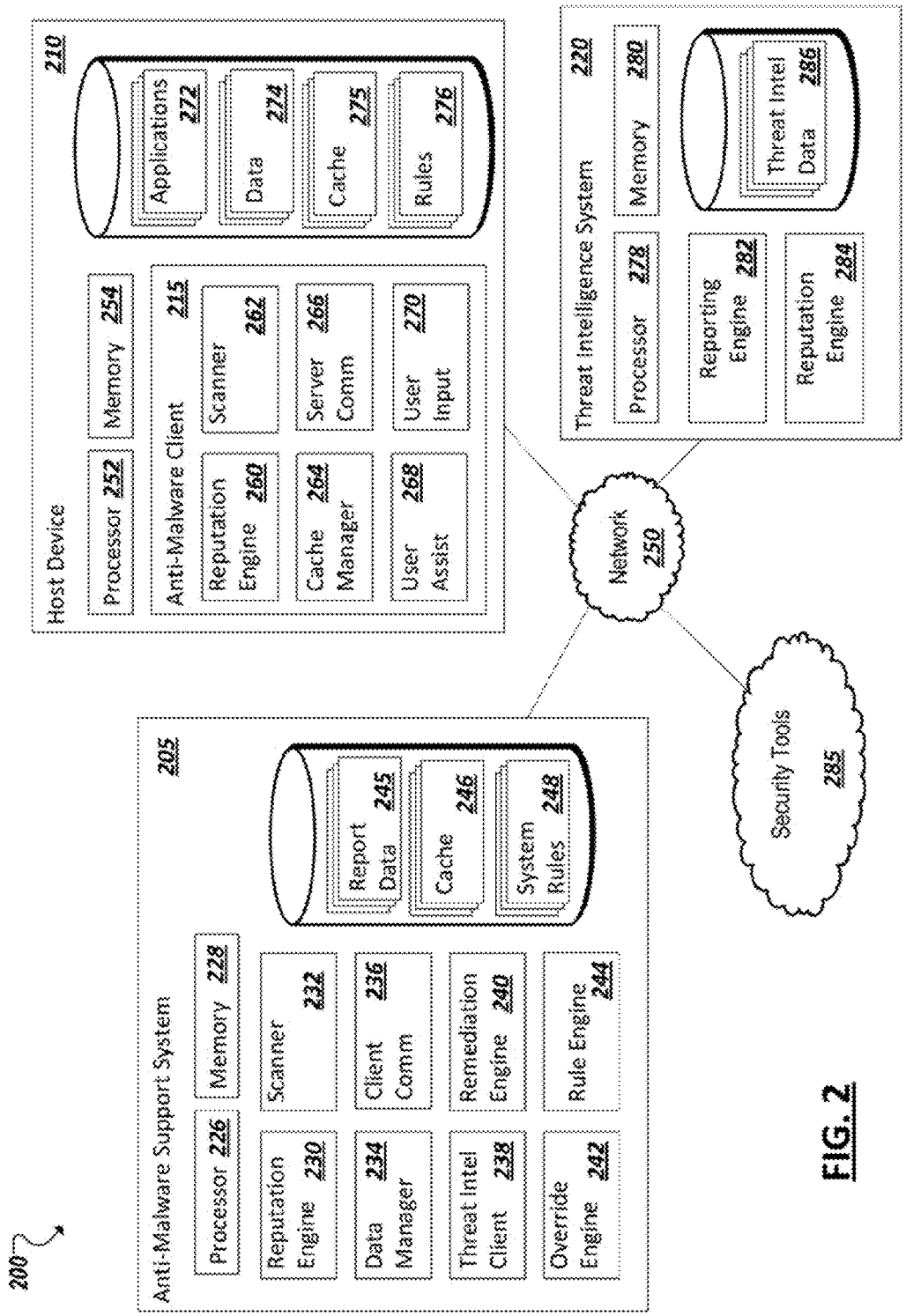
FIG. 2 is a simplified block diagram of an example system including an example antimalware support system in accordance with one embodiment.

In some instances, computing devices can be dedicated to handle the more resource-intensive aspects of antimalware detection and remediation, including the updating of antimalware definitions and content, among other examples, and provide at least a portion of an antimalware solution on behalf of one or more client host devices. The host devices can additionally retain at least a portion of the antimalware solution local on the host device. For example, systems and tools can be provided, similar to those described in the present Specification, that provide these and other benefits and resolve many of the above-described issues in traditional antimalware solutions. For instance, as shown in the example of FIG. 2, a simplified block diagram 200 is shown illustrating a system or computing environment that includes, for instance, an antimalware support system 205, one or more host devices (e.g., 210) each including a respective local antimalware client (e.g., 215), one or more threat intelligence systems (e.g., 220), other security tools (e.g., 225), among other examples, including components and subsystems combining or further dividing functionality of the various subsystems and component described in connection with this particular example.

An example antimalware support system 205 can include one or more processor devices (e.g., 226), one or more memory elements (e.g., 228), as well as one or more logic components implemented in software and/or hardware to provide functionality of the example antimalware support system 205. Such components can include, for example, a reputation engine 230, a scanner 232, a data manager 234, a client communication module 236, a threat intelligence client 238, a remediation engine 240, an override engine 242, and rule engine 244, among potentially additional components and corresponding functionality, as well as components combining (or further dividing) the functionality described in connection with the foregoing examples.

A host device 210 can be one of several host devices making use of antimalware support system 205. Each host device (e.g., 210) can include one or more processor devices (e.g., 252) and memory elements (e.g., 254). Additionally, each host device (e.g., 210) can include a local antimalware client (e.g., 215). In some implementations, antimalware client 215 can be a thin antimalware client. For instance, in some examples, antimalware client 215 can be provided with a minimal subset of antimalware functionality. The subset of antimalware functionality can be selected so as to realize a relatively small footprint on the host device 210 in terms of the antimalware client's 215 demands on memory and processing resources of the host device 210. Further, that subset of antimalware functionality assigned to the host device's local antimalware client 215 can be provided so as to optimize the amount of malware that can be detected and remediated at as low a computing cost as possible or desirable. Antimalware activities that can be performed simply and with relatively little to moderate computing overhead can be configured to be performed by antimalware client 215. Antimalware tasks that are beyond the capabilities and familiarity of the antimalware client 215 can be escalated to a remote antimalware support system (e.g., 205). The remote antimalware support system 205 can include comprehensive, and in some cases, customized, antimalware functionality and resources to address antimalware issues that cannot be effectively handled by the host device's 210 local antimalware client 215.

While all of the antimalware detection and remediation for a given host device could be provided by a remote antimalware support system (e.g., 205) in accordance with the concepts described in the Specification, in some implementations and domains this can be undesirable. In some instances, a purely server-driven antimalware approach can be difficult to scale. For instance, in a large enterprise network employing many host devices (e.g., 210) serviced by a given antimalware support system (e.g., 205), were host devices (e.g., 210) to rely solely on antimalware support system (e.g., 205) for their respective antimalware protection, maintaining an antimalware support system 205 and network resources (e.g., 250) capable of handling such demand may be too expensive. Indeed, over-taxing a server-based antimalware solution can result in performance delays by the server-based antimalware solution. In many cases, delays in the detection and remediation of malware can lead to costly and severe damage to the host device and associated domain. Accordingly, an antimalware client 215 can further possess functionality for addressing malware representing "low hanging fruit" resulting in such malware issues being detected and/or remediated without the involvement of the an antimalware support system (e.g., 205). Additionally, antimalware support systems 205 can employ traffic management techniques so as optimize use of network bandwidth in connection with outbound messages communicated from the antimalware support system 205 to antimalware clients (e.g., 215) supported by the antimalware support system 205, among other examples.

In one example, antimalware client 215 can include one or more components or modules through software and/or hardware for realizing various functionality of the antimalware client 215. For example, an example antimalware client 215 can include such components as a reputation engine 260, scanner 262, cache manager 264, server communication module 266, user assistance engine 268, user input engine 270, among other potential examples and combinations of the foregoing. In one example, antimalware client 215 can include functionality for determining whether or not to allow a particular file to be loaded. A data store, or cache 275, of records can be maintained locally on the host device 210, and can include information for a limited subset of files installed on, accessed by or accessible to, or likely to be encountered by the host device 210, among other examples. The cache 275 can further include descriptions of behaviors and characteristics of the respective files, including, in some cases executable and/or non-executable files. In some instances, the cache 275 can be limited to only executable files, among other examples. The cache 275 can also include reputation data for the respective file or object.

An example reputation engine 260 can be rules- or policy-based and can utilize cache 275 to identify reputation scores for the identified file and/or determine a reputation score based on behaviors or characteristics of the file identified in the cache records, for example. In some instances, characteristics can include whether the file has a certificate or signature. An example reputation engine 260, in some examples, can have access to a local listing of a set of certificates (and/or publishers associated with one or more certificates, such as popular, trusted software vendors) and determine a reputation based at least in part (and in some cases solely) on whether the file is signed with an approved, verified, and/or trusted certificate. That the file is signed with certificate can be insufficient, as some malware is itself issued and signed with certificate. A given certificate may only be included in the local listing if the certificate has been verified as belonging to a reputable vendor, publisher, etc., for instance, based on intelligence gleaned from antimalware support server 205 (and/or threat intelligence system 220). Additionally, a combination of factors, behaviors, and characteristics can be considered by a reputation engine in determining a reputation score for the file or determining whether the file satisfies rules 276 defined for a particular domain (e.g., as communicated, for instance, by antimalware support server 205).

In some instances, antimalware client 215, in addition to possessing simplified malware assessment functionality through reputation engine 260, may additional include simplified scanning functionality through, for instance, an example scanner 262. Scanner 262 can include functionality for identifying, from the file, whether the file possesses one or more pre-defined behaviors capable of being discovered from the binary file by scanner 262. Scanner 262 may be limited to identifying only a subset of more easily discoverable executable file behaviors in one example. A scanner 262 can be used by antimalware client 215, for instance, to scan a file prior to the loading of the file, to attempt to discover behaviors of the file. Behaviors discovered for the file can be documented in cache 275 and further considered by reputation engine 260. Such discovered behaviors can be the basis for approving or denying, at antimalware client 215, whether the file has a satisfactorily trustworthy reputation and can be loaded.

In some implementations, antimalware client 215 can utilize a series or hierarchy of assessments and scans in an attempt to more quickly and efficiently conclude whether a particular should be loaded or not on the host device 210. More resource intensive operations of the antimalware client 215 can be postponed in the event less resource intensive operations (performed first) prove conclusive. Additionally, if the antimalware assessment functionality of the antimalware client 215 is exhausted for a given file, the antimalware client may then escalate assessment and handling of the file to the antimalware support system 205 for the domain. In one example, antimalware client may first attempt to determine whether the file is known and whether a determinative assessment has been made regarding the file and its reputation (together with a confirmation that the file has not been modified since this assessment). If the cache 275 records reveal determinative information concerning the file, the antimalware client 215 can correspondingly act to either conclusively permit or deny loading of the file on host device 210 consistent with the information described in the cache 275. However, if cache record are at least partially inconclusive, antimalware client 215 (e.g., using reputation engine 260) can move to a second assessment, such as an attempt to identify a certificate of the file and determine whether the certificate is one previously identified as trusted (or even untrusted). Additional features of the file can also be determined if earlier assessments have proven inconclusive, including determining behaviors of the file (e.g., using scanner 262) and the reputation engine 260 can determine whether a combination of the discovered traits violate or satisfy a given rule (e.g., 276) so as to conclusively allow or block the file.

As an example, assessments of a particular file by the antimalware client 215 can conclude that there is no record of the file, that a certificate of the file is neither known to be trusted or untrusted, and that the file is a packed file. In this particular example, rules (e.g., 276) for a particular domain can define that such a combination of features should not be allowed to be loaded on the host device 210. Further, the antimalware client 215 can send a copy of the file along with information gathered for the file to the antimalware support system 205 for more information. A query to the antimalware support system 205 can yield results that, in some cases, then allow the file to be loaded on the host device 210 (e.g., based on an assessment by the antimalware support system 205 that the file is not malicious and can be trusted).

As discussed above, when an antimalware client 215 is able to sufficiently assess files for malware using the subset of information and functionality provided, the antimalware client 215 can spare the involvement of the antimalware support system 205 for queries by other antimalware clients (or security tools) in the domain, including on other host devices within the domain. Indeed, in some implementations, an antimalware support system 205 can provide support to a multitude of host devices. Further, as noted above, in some instances, the antimalware client 215 can communicate with the antimalware support system 205 (e.g., over one or more networks 250 utilizing server communication module 236) in connection with the assessment of one or more files detected at the host device (e.g., 210). In some instances, the antimalware client 215 of a host device 210 can determine that it possesses insufficient information to definitively determine whether a particular file should be loaded on the host device. In some instances, the host device 210 can query the antimalware support system 205 for additional intelligence or to apply additional scanning or assessment functionality available at the antimalware support system 205. Such a query can include information detected by the antimalware client 215, such as behaviors of the file, an identification of a detected publisher of the file, a URL associated with the file (e.g., a source of the file), the type of file, a certificate of the file, among other examples of basic information identifiable using the antimalware client 215.

An antimalware support server 205 can utilize information received from an antimalware client 215 to both attempt to generate a response to the antimalware client 215 as well as supplement its own records (e.g., cache 246). As antimalware support system 205, in some examples, will support multiple host devices and antimalware clients, including various types of host devices (and/or antimalware clients), antimalware support system 205 can obtain a wealth of information from the supported devices as they submit queries for assistance or simply report the identification of files, changes to files or file behaviors, etc. that are inconsistent with the respective hosts' previous cache records (e.g., 275). Further, some host devices may possess functionality that other host devices served by an antimalware support system 205 do not. For example, some devices may possess hardware-based scanners that are capable of identifying file behaviors and characteristics at the processor level (e.g., below the operating system level), that other host devices may not be able to detect (e.g., because they utilize different chipsets not employing such technology). However, characteristics identified by any one host device (or corresponding antimalware client) can be effectively used by every other host device within the domain as the antimalware support system 205 sources file information from each of the various host devices it supports. For instance, a query by a first host device that is unable to detect a certain behavior of a particular file can query the antimalware support system 205 for additional information or assessment of the particular file. The antimalware support system 205 may have obtained additional information for the particular file from another host device in the domain and can apply this information in addressing the query of the particular host device, among other examples.

An antimalware support system 205 can obtain a variety of information for use in assessing potential malware detected by anyone of a variety of antimalware clients on host devices within the domain supported by the antimalware support system 205. For example, in addition to developing crowd-sourced, or collaborative, intelligence about the variety of files encountered by the hosts in its domain, the antimalware support system 205 can additionally collect, generate, and use further statistical and heuristic information that can be the basis for a reputation score or other assessment. For instance, an antimalware support system 205 can collect first contact information identifying the date and conditions of a particular file (e.g., by a particular host device) within the domain. This information can be used, for instance, to track the development, evolution, or spread of a particular file within the domain, among other examples. Additionally, prevalence data can be generated and maintained by the antimalware support system 205 documenting the frequency that a particular file or event is detected by antimalware clients in the domain. In some instances, the prevalence of a particular file or event can serve as an additional data point for assessing the likelihood that the file or event corresponds to something malicious. As an example, in some instances, a file having zero prevalence (i.e., detected on only a single host) can be evidence of a polymorphic malware, when combined with other characteristics determined for the file (e.g., by the antimalware client and/or antimalware support system). In another example, high prevalence of a file can also be incorporated within an assessment of a file or event as malicious or trustworthy, among other examples.

An antimalware support system 205 can respond in a variety of ways to a received query (or other data) from an antimalware client (e.g., 215). For instance, as antimalware clients 215, in some examples, may possess a relatively limited subset of information available (e.g., at the antimalware support system 205) concerning various files, file certificates, file behaviors and characteristics, etc., a query by an antimalware client 215 may seek to obtain any additional intelligence available at the antimalware support system 205. Such queries can be responded to in substantially real time with little delay to the antimalware client. For example, in response to a query for more information about a particular file, an antimalware support system 205 can return additional information concerning behaviors detected for the file by other antimalware clients, from threat intelligence system 220, or another source. The antimalware client 205 can utilize this additional information to performed a more complete assessment of the file (e.g., using reputation engine 260) based on the rules 276 driving the assessment to finally determine whether to allow or deny loading of the particular file, among other examples.

In some instances, an antimalware support system 205 can perform a reputation assessment (e.g., using a more robust reputation engine 230) on behalf of the antimalware client 215 in response to a query of the antimalware support system 205 in connection with a particular file detected at the host device 210. As noted above, antimalware support system 205 can have access to additional information, including trend, heuristic, and aggregated data, and can generate a reputation score of the particular file based on this information together with any information provided by the antimalware client 215 or described for the file in the antimalware support system's 205 own cache. The antimalware support system 205 can then return the reputation assessment result to the antimalware client 215 prompting the antimalware client to act on the information, as well as update its own cache records 275 (e.g., using cache manager 264) based on the feedback received from the antimalware support system 205. Upon updating its cache 275 to reflect the information obtained from the antimalware support system 205, future encounters with the file can be handled simply at the antimalware client 215 by identifying the previously determined reputation information in the cache 275 (e.g., provided the character of the file has not been modified since the initial encounter and assessment, etc.).

In still other examples, an antimalware support system 205 can receive a query from an antimalware client (e.g., 215) for a particular file which even the antimalware support system 205 is unable to conclusively assess. While between the combined functionality of the antimalware client 215 and antimalware support system 205 (with additional support and intelligence of a threat intelligence system 220) much of the files identified at hosts (e.g., 210) within the domain can be definitively categorized as safe (or "white") or unsafe, untrustworthy, or "black," still other files, such as files newly discovered on the domain, may remain somewhere in between, or "gray." In some instances, an antimalware support system 205, upon concluding that a particular file is gray can report this information to the antimalware client 205. In some instances, depending upon the rules (e.g., 248, 276) set for a domain, a gray file may be automatically blocked at the host device, while in other instances, a determination that a file is gray may result in a user of the host device 210 (or administrator of the domain) being given the option of loading the file despite this finding, among other examples.

In some instances, if neither the antimalware support system 205 nor the antimalware client 210 can resolve the reputation of a particular file (including, in some instances, with the additional assistance of threat intelligence system 220) using information already available to the respective systems, antimalware support system 205 can make use of scanner utilities (e.g., 232) available to it to perform deeper analyses and scans of the file. In traditional systems, a file that could not be resolved may have been sent to another vendor for analysis. In some implementations of an antimalware support system 205, a scanner 232 can be provided that can scan the file, for instance, by allowing the file to be loaded and/or executed in a sandbox or other virtual or protected environment and scanned to assess the various behaviors and potential maliciousness of the file, among other examples. Once a scanner 232 returns some results for the file, the antimalware support system 205 can communicate this additional information to the antimalware client 215 to update the cache 275 of the antimalware client 215, among other examples.

As noted above, in some examples, a user can be presented with an option as to how to handle a particular file, website, event, etc. encountered on a client device. Such functionality can be expanded beyond decisions of whether to allow a particular file to be loaded or not in connection with an assessment involving at least antimalware client 215. For instance, allowing a file to execute, make changes to other files, install files, add data to memory, access particular online resource, etc. can cause a user of the host device to be prompted (e.g., using user assistance engine 268) for permission to being/continue the operation. Some traditional downloaders and other tools may ask users for permission through a presentation of interactive prompt, however, users are often left to their own devices in determining the appropriate response to the prompt. The more cautious or capable users may attempt to scour the internet for information regarding the risks inherent in granting permission in response to such a prompt, although such efforts can not only be inconvenient but reliant on potentially irrelevant, outdated, or incorrect information, among other potential issues. In some implementations of an example antimalware client 215, user assistance engine 268 can identify events that trigger presentation of a permission prompt for the user. In connection with such a permission prompt, the user assistance engine 268 can query cache 275 as well as, in some instances, antimalware support system (or even a threat intelligence system 220) for additional intelligence regarding the nature and potential risks associated with the event for which permission is requested. For instance, the permission prompt can identify that a certificate of a file associated with the event is trusted/untrusted/unknown, can identify that the event is the first detected of its kind (e.g., a first contact event of the domain), involves a file capable of performing a particular set of behaviors, involves a file, URL, publisher, vendor, etc. with a particular computed reputation score, among other examples. The user can elect to utilize this data (or even have this data presented to them if they are interested) in connection with a decision to grant or deny permission of the event.

In addition to providing information to a user in connection with user-driven permissions or actions based on collective intelligence derived from an antimalware support system 205, in some examples, an example antimalware client 215 can additionally capture the response of a user to a particular event, including permission prompts, and report this feedback to the antimalware support system 205 (e.g., using user input engine 270). Such user-provided intelligence can be used by antimalware support system 205 to further supplement the intelligence it collects about particular files, events, URLs, publishers, etc. and uses to provide antimalware support to antimalware clients in the domain. Additionally, in addition to cumulating and crowd-sourcing intelligence from the multiple antimalware clients it serves, the antimalware support system 205 can additionally crowd-source information based on the variety of user feedback it receives, such as users' responses to various prompts, including prompts serviced by example user assistance engines (e.g., 268). Further, this user-based intelligence can be delivered for use by example user assistance engines (e.g., 268). For instance, a user assistance engine 268 can present, along with detected characteristics of a file or event, a summary of how other users responded to the prompt. For instance, a permission prompt can identify, as an example, that 23% of users in a domain granted permission for an event based on a similar permission prompt, potentially evidencing to the current user that they should respond in kind, among potentially many other examples.

Occasionally, in some implementations, rules (e.g., 276) as well as records and information in cache 275 concerning one or more files can be updated. For instance, the cache (e.g., 275) of a particular host-based antimalware client 215 may be incomplete or out-of-date. As the corresponding antimalware support system 205 may be constantly identifying new files and associated file intelligence from other antimalware clients in the domain as well as through threat intelligence system 220, in some instances, it can become prohibitively expensive for the antimalware support system 205 to be continuously broadcasting any and all such updates to all of the potentially many host-based antimalware clients serviced by the antimalware support system 205 in the domain. In some implementations, such updates can be tailored to each antimalware client and be performed at least partially in an opportunistic manner. As an example, antimalware support system 205 as it receives communications from various host devices concerning various files encountered on the host devices (e.g., 210), the antimalware support system 205 can correspondingly record that the respective files reside on or have some other relevance to the host devices submitting queries or reporting information about them. Through records (e.g., 246) associating files with various host devices (e.g., 210) in the domain, the antimalware support system 205 can correspondingly filter what update information is sent to each host device. The antimalware support system 205 can maintain or otherwise access (e.g., from an asset management system of the domain (not shown)) other information for the host devices in the domain to further discover whether particular information and updates are relevant to the host devices. Indeed, such information can be used when first provisioning a subset of file records and other data in cache 275 customized for use by the antimalware client 215 in addressing those files, events, and issues most likely to be encountered at the host device 210.

An example antimalware support system 205 can further time communications and updates for various host devices opportunistically. For example, rather than broadcasting a particular update (e.g., of file behavior information, among other examples) to the set of antimalware clients to which the update is likely relevant, the antimalware support system 205 can seek to piggyback such updates on other responses to or communications with the host device so as to maximize the bandwidth consumed in such communications. As an example, an antimalware client 215 can query antimalware support system 205 for more information concerning a particular file (if available). In response, the antimalware support system 205 can identify that the query is from the antimalware client 215 of host device 210 and further determine whether the antimalware support system 205 has any updates for the antimalware client 215 since the last time an update was issued. Indeed, antimalware support system 205 can maintain, for each antimalware client it supports, a queue of updates that should be delivered during the next opportunity to communicate with the antimalware client. Continuing with the previous example, in addition to providing a response to the query with additional information about the particular file, the antimalware support system 205 can additionally provide update information for the antimalware client (e.g., for use in updating cache 275), including update information for files and events other than the particular file that was the subject of the query.

While opportunistic updating can be employed by an antimalware support system 205, such as in the examples above, in other instances, antimalware support system 205 may push at least some of the updates to corresponding antimalware clients (e.g., 215). For instance, if a particular threshold time has expired since a last update, the antimalware support system 205 can push updates to the antimalware client 215, for instance, the next time the host device is started or otherwise available on the network, etc. Further, a subset of the updates can be identified as high priority updates and these can be pushed to their respective antimalware clients according to a shorter threshold time or immediately, among other examples. Further, in still other examples, some update information can be broadcast to two or more antimalware clients serviced by the antimalware support system 205, for instance, to report a change to a rule (e.g., 276) to be applied by the particular antimalware client, among other examples.

As updates are received identifying new or updated characteristics of file already identified in cache 275 or as new files are identified, a cache manager 264 of antimalware client 215 can update the cache 275. While in traditional antimalware tools content and caches can expire and the entirety of the cache is replaced, for instance, on a daily basis, to ensure that the cache remains current, the cache 275 managed by antimalware clients (e.g., 215), in some examples, can be piecemeal and selective, such as in response to specific update information affecting only a subset of the records in the cache 275. Additionally, rather than replacing the entirety of the cache 275 or even a single record of the cache 275, particular metadata of a cache record describing such characteristics as a file's certificate, behaviors, reputation score, etc. can be maintained persistently until an update is received (or additional characteristics are identified locally using antimalware client 215), allowing for precision in updating only those particular elements of the record based on the update information received. This can, among other potential benefits, allow for more economical updating of the cache 275 both in terms of network traffic for coordination of updates with an antimalware support system 205 and processing overhead at the host device 210, which, in some cases, may be a mobile computing device or other computing device with more streamlined or focused processing capabilities or design.

In some implementations of a thin antimalware client (e.g., 215), remediation functionality can be provided to remediate certain subsets of detected malware at the host device 210. In other instances, an example thin antimalware client can be focused on deciding whether a particular file (executable and/or non-executable) should or should not be loaded, executed, etc. based on whether the particular file satisfies rules defined for the host device (e.g., 210) and/or domain. More robust remediation functionality can be provided through antimalware support system 205 (e.g., through remediation engine 240). In one example, antimalware client 215 can request remediation of a particular issue discovered on or relating to the corresponding host device 210, including issues identified by the antimalware client 215 alone or with assistance of the antimalware support system 205. The antimalware support system 205, in such instances, can identify a corresponding remedy for the issue and cause the remedy to be applied to the host device 210.

For instance, in one example, a library of remediation scripts or tools can be maintained at the antimalware support system 205. In traditional antimalware tools, such a library of tools may have been attempted to be incorporated within the host-based tool itself, to the extent providing a full library of available antimalware remediation functionality was possible given memory and processing constraints of the host device. In one example implementation, the antimalware support system 205 can identify one or more remediation scripts as candidates for remediating a particular identified issue at the host device. The selection of the particular remediation scripts can be based, in some examples, on feedback received from similar other host devices in the domain regarding the effectiveness of the remediation scripts, among other examples and considerations. The antimalware support system 205 can then send the selected remediation scripts to the antimalware client 215 on the host device 210 for use (e.g., in connection with other logic on antimalware client 215 capable of executing or otherwise using the functionality of such scripts) by the antimalware client 215 to remedy the issues at the host device 210. Once remediation of the issues is confirmed (e.g., in some instances, based on a query of the antimalware support system 205 for confirmation or through further operations of the remediation script), the antimalware client 215 can dispose of the received remediation scripts to reserve resources for potentially other scripts that may be used in the future by the antimalware client 215 to address other malware issues. In a sense, the antimalware remediation script can be considered, in some implementations, as a dissolvable tool that is used and then disposed of by the antimalware client 215, among other examples. As other malware issues are encountered, the antimalware client 215 can send subsequent requests for remediation to the antimalware support system 205 and can be provided with other remediation scripts from the antimalware support system's library that correspond to the other malware issues, and so on.

In other, or supplemental, implementations, a remediation engine (e.g., 240) of the antimalware support system 205 can perform at least a portion of the remediation of a malware issue on a host device (e.g., 210) at the antimalware support system 205. For instance, in one example, remediation engine 240 can include a virtual machine or virtual environment that permits weightier remediation processes to be run within the virtual environment on behalf of and to remediate the issue on the host device 210. For example, a filter driver of the virtual environment (or antimalware support system 205) can intercept certain operations instantiated and run from the virtual environment and redirect the operation to the host device so that the logic is executed within the virtual environment but the operations are performed on the host device (i.e., rather than the virtual environment). In some instances, a variety of antimalware tools and processes can be run within the virtual environment, including a battery of normally incompatible or redundant processes, such as a battery of antimalware remediation processes provided by different third-party vendors. Such a set of remediation processes can be each run in series within virtual environments provided through the remediation engine 240, and can be predefined as a recipe for addressing certain malware issues by the antimalware support system 205, among other examples.

In still other examples, a remediation engine 210 can be used to launch or initiate certain processes remotely on the host device 210 in connection with a remediation diagnosis of one or more particular malware issues discovered and/or reported on the host device. For example, a remediation step can include, in some instances, remote rebooting of the host device, calls through an API to one or more hardware-based security or system management services available through a chipset of the host device 210 (including services that may allow access to the host device when disabled or when the operating system is not operational, among other examples), among other potential examples. Such remotely-invoked remediation steps can be paired with other remediation operations including remediation operations served in virtualized environments provided by remediation engine 240 or remediation scripts provided by the remediation engine 240 for local execution on the host device, among other examples utilizing remediation assistance functionality of the antimalware support system 205. Further, as noted above, feedback data can be collected reporting the effectiveness of various remediation techniques managed by the antimalware support system 205 for a particular host device 210 and this feedback can be used as the basis of selecting (or not selecting) certain remediation techniques in connection with subsequent efforts by the antimalware support system 205 to assist with the remediation of similar malware issues on other host devices within the domain, among other potential features and benefits.

As noted above, malware detection and assessment at an antimalware client (e.g., 215) in example environment 200 can be rules- or policy-based. Rule definitions (e.g., 276) can be maintained locally at the host device 210 for use by the antimalware client 215. Such rules can be provided by and updated according to system rules 248 maintained by the antimalware support system 205. Some rules 276 at the host device 210 can be tailored or be specific to the host device 210, such as rules that are specific to the particular functionality, feature, make, model, etc. of the host device 210. In other words, the rules 276 maintained at a host device 210 may only be a subset of the rules (e.g., 248) maintained for an entire domain by the antimalware support system 205. Additionally, updates sent to the host device 210 may be tailored to updating the particular subset of rules relevant to the host device, among other examples.

In some instances, a particular host can migrate between multiple different domains, such as a work, school, and/or personal domain, or network. Such scenarios are becoming increasingly common with the increased mobility of personal computing devices and the acceptance of bring your own device (BYOD) policies by employers and other institutions. In some instances, a single antimalware client (e.g., 215) of a host device 210 can be configured to determine what domains are applicable to the host device 210 at a particular instant, such as based, for instance, on networks with which the host device 210 can detect or access, geolocation data, and a sign-on to the network, etc. Further, multiple different rule sets can be maintained by the antimalware client 215 for the host device 210 for each of the domains to which the host device 210 is known to associate with and communicate in. The antimalware client 215 can identify the rule set(s) (e.g., 276) that it is/are to apply, as well as the respective antimalware support systems with which the antimalware client is to communicate and operate based when within the respective domain. Indeed, in some instances, an antimalware client 215 can determine that a host device is within, logically or physically, two or more domains simultaneously, and can apply rules from each domain to the extent possible, among other examples.

In some implementations, an antimalware support system 205 may possess functionality (e.g., through rule engine 244) to custom-define and tailor rules 276 to a particular domain. The data (e.g., 274) and applications (e.g., 274) hosted within a given domain can vary widely together with the goals, risk tolerances, and character of the business, educational, governmental, non-profit, or personal entity. Traditional antimalware tools utilize a predominantly one-size-fits all model, representing in some cases, the antimalware tools' goal to detect and potentially remediate any and all malware that a given host or domain may potentially be exposed to. However, what may not be regarded as malware by some can be regarded as malware by others, and what may be considered as safe by some may be regarded as untrustworthy by others, and so on. Further, some objects and files may possess many characteristics commonly shared with malware, such as packed files, among other examples. As a result, some antimalware products employ under-inclusive (or over-inclusive) algorithms for categorizing files as malware or not, among other potential deficiencies. An administrator of a domain, using antimalware support system 205 may be able to custom define rules for defining how to classify files as malicious, trusted, unknown, mixed, etc. In some instances, a default set of rules can be provided and rule engine 244 can be used to tailor exceptions, exclusions, and other customizations of the domain's rule set using the default set as a starting point, among other examples.

Further, an example antimalware support system 205, in some instances, can consumer data from one or more threat intelligence systems 220 collecting and processing security data across multiple different domains and from multiple different types of security tools (e.g., 285) monitoring various aspects of those domains. Such security tools 285 can include, among other examples, other antivirus and antimalware tools, host intrusion protection systems, network intrusion protection systems, web gateways, email gateways, intrusion detection systems, data-leak prevention systems, firewalls, whitelist/blacklist managers, and other host- and network-based security tools within multiple different domains.

Example threat intelligence systems (e.g., 220) can include one or more processor devices (e.g., 278), one or more memory elements (e.g., 280), among one or more hardware and/or software-based components, such as, for example, a reporting engine 282 and reputation engine 284, among other potential examples and combinations of the foregoing. In some instances, threat intelligence systems 220 can provide intelligence (e.g., through reporting engine 282) that identifies various threats, including malware, detecting among the various domains and systems providing the threat intelligence system 220 data. Indeed, antimalware support system 205, antimalware clients (e.g., 215), and other security tools of a domain can also supply data to one or more threat intelligence systems (e.g., 220) in some examples. A reputation engine 284 can be used to apply certain global classifications to the information collected and reported by the reputation engine 284. In some instances, however, threat intelligence systems 220 can also suffer from issues of being over-inclusive, under-inclusive, too conservative, or too liberal, etc. in their reporting and characterization of information it receives. For instance, files, events, sources, etc. that are considered malicious to a particular domain but not necessarily to others may be completely (or at least partially) omitted or inadequately characterized in intelligence data served (e.g., to antimalware support system 205) by the threat intelligence system 220. Further, some threat intelligence data may be regarded differently by the domain such that it can be ignored. Additionally, data collected within the domain, for instance, from antimalware clients (e.g., 215) monitoring various hosts in the domain, may be used to supplement the threat intelligence feed received from a threat intelligence system 220, among other examples.

In some example implementations, antimalware support system 205 can include an override engine (e.g., 242) or other functionality (e.g., provided through rule engine 244) adapted to tailor threat intelligence data received from one or more threat intelligence systems (e.g., 220) according, for instance, to one or more preferences (and/or rules (e.g., 248)) of the domain. For instance, exceptions can be defined for threat intelligence data (e.g., 286) generated and served by threat intelligence systems (e.g., 220) to exclude certain types of information, such as information that is based on rules or assumption not adopted by the domain or relating to events, objects, URLs, publishers, etc. that the domain considers trustworthy. Further override engine 242 can additionally supplement or modify reputation scores and other data received from the threat intelligence systems (e.g., 220) to account for particular characteristics, files, or issues unique to or otherwise of interest to the domain, among other examples.

Figure 3:
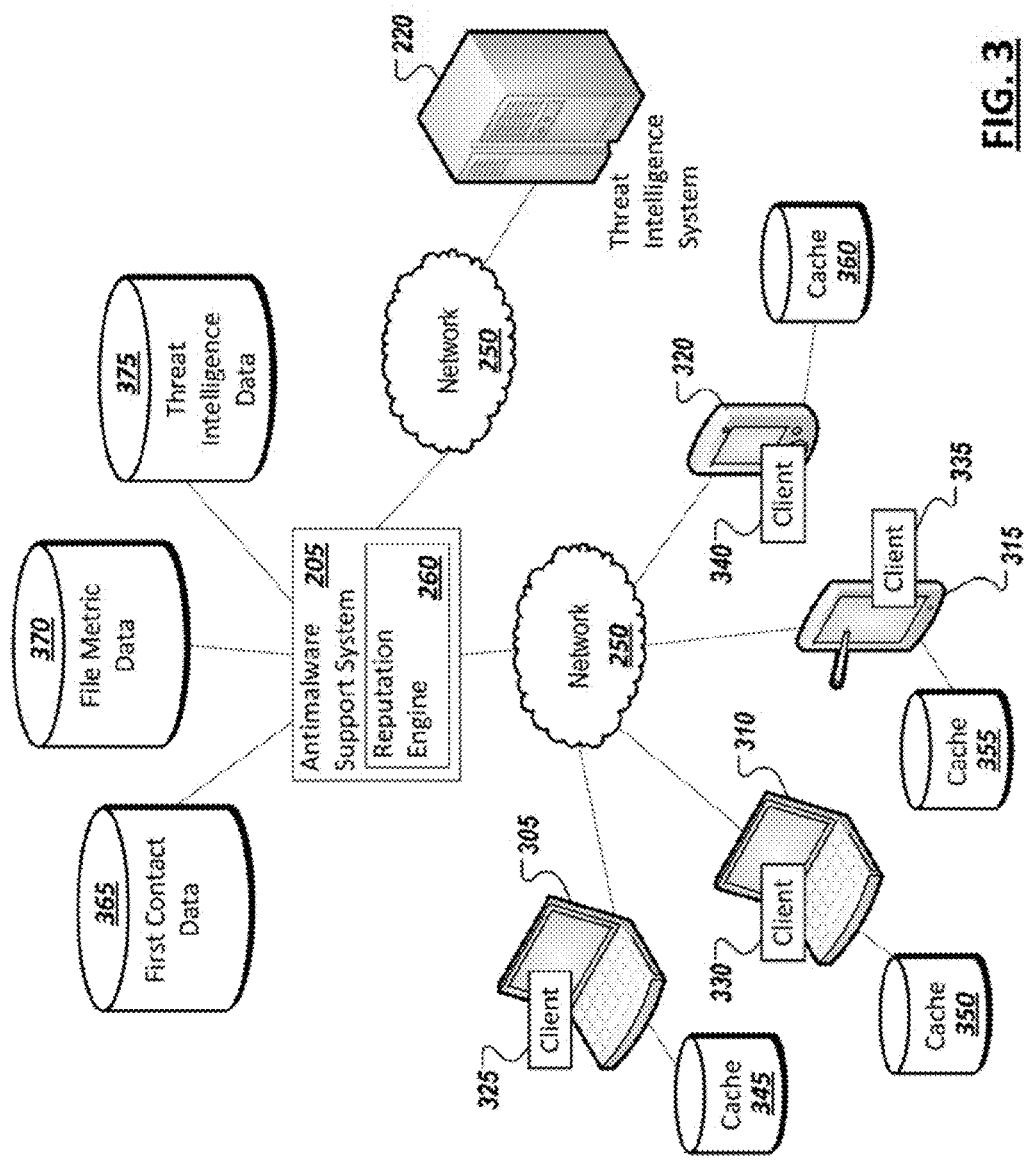
FIG. 3 is a simplified block diagram representing an example criticality assessment of an asset in a computing network in accordance with one embodiment.

Turning to FIG. 3, a simplified block diagram is shown illustrating an example computing environment including antimalware support system 205 of a domain including multiple host devices 305, 310, 315, 320. Each host device (e.g., 305, 310, 315, 320) can include a respective antimalware client (e.g., 325, 330, 335, 340) that utilizes a respective local cache (e.g., 345, 350, 355, 360) of the host device in connection with preliminary assessments of files on the host device. Antimalware support system 205 can send updates to the various hosts (e.g., 305, 310, 315, 320) it services within the domain and the hosts (e.g., 305, 310, 315, 320), in some cases, through their respective antimalware clients (e.g., 325, 330, 335, 340) can update their respective local caches (e.g., 345, 350, 355, 360) in response to the update.

In one example implementation, antimalware support system 205 can maintain reputation data that it can use to generate reputation assessments for files encountered (e.g., by antimalware clients 325, 330, 335, 340) in the domain as well as develop update data to be distributed to the host devices 305, 310, 315, 320 in the domain. In one example, antimalware support system 205 can include first contact data 365, file metric data 370, threat intelligence data 375, among other potential examples. Further, it should be appreciated that the foregoing data can be combined and included in a single or multiple different records maintained by the antimalware support system 205 for the file, among other examples.

Example first contact data 365 can identify the instance, within the domain, when a file was first identified within the domain. First contact data 365 can be associated with the file, including a hash of the file or other identifier of the file. Further, first contact data can identify when and how the file was first encountered, such as by a particular host device in the domain. Accordingly, in such examples, first contact data can identify the host device that first encountered the file, as well as describe characteristics of the first contact (e.g., as described in data reported by the host device, such as collected by the host's antimalware client).

Example file metric data 370 can describe characteristics of a file known to antimalware support system 205. Such characteristics can include an identification of the file's certificate, publisher, behaviors, etc. Further, file metric data 370 can include statistical data, prevalence data, URLs, IP addresses, and other information describing the file's presence or entry within the domain. Antimalware support system 205 can update and supplement file metric data as additional information is obtained from the variety of host devices (e.g., 305, 310, 315, 320), for instance, in connection with queries received from antimalware clients (e.g., 325, 330, 335, 340). File metric data 370 can be based on feedback data for a file as detected and analyzed by multiple different host devices within the domain. As the functionality of host devices 305, 310, 315, 320 in domain can vary in terms of what characteristics can be detected on the host device 305, 310, 315, 320 as well as the contexts or host device uses in which the characteristics are detected, pooling information detected at these devices can assist in making file metric data 370 maintained by the antimalware support system 205 more comprehensive. File metric data 370 (along with other data describing files maintained by antimalware support system 205) can also be indexed by a corresponding file identifier, such as a hash of the file or other identifier.

Antimalware support system 205 can consume threat intelligence data served by threat intelligence system 220. Threat intelligence data can be based on observations of multiple different sensors collected from multiple domains. Antimalware support system 205 can maintain threat intelligence data 375 based on the information obtained from threat intelligence system 220. In some instances, antimalware support system 205 can apply domain specific rules, preferences, and/or exceptions to threat intelligence data received from a threat intelligence system 220 to bring the data more into accordance with the antimalware rules and domain-specific conditions within the domain. In some instances, threat intelligence data can be further indexed by file, in some instances, describing files outside of the set of files discovered within the domain, among other examples.

Antimalware support system 205 can utilize combinations of first contact data, file metric data 370, threat intelligence data 375, among other data collected and generated through information obtained from the host devices 305, 310, 315, 320 and threat intelligence system 220 to assess reputations of the respective file. A reputation assessment can involve applying domain-specific (or domain-wide) rules to the file's data (e.g., 365, 370, 375) maintained by the antimalware support system 205. A reputation score can be generated by the antimalware support system 205. Reputation assessment data describing the reputation assessment of the antimalware support system 205 can be generated and associated with the file and maintained by the antimalware support system 205.

Antimalware support system 205 data (e.g., 365, 370, 375) describing a file may be more complete and/or up-to-date than corresponding data for the file maintained at any one of the local caches (e.g., 345, 350, 355, 360) of host devices 305, 310, 315, 320 in the domain. Indeed, antimalware support system 205 can maintain data for files not identified or included in the local caches 345, 350, 355, 360 of host devices 305, 310, 315, 320. In some implementations, a host device may limit the file data maintained at the host device's local cache to those files already detected at the host device. Accordingly, antimalware support system 205 can provide updates to the local caches of the host devices on an as-needed basis, in some instances, and in response to the host device detecting a file described in the antimalware support system data (e.g., 365, 370, 375), among other examples.

Figure 4:
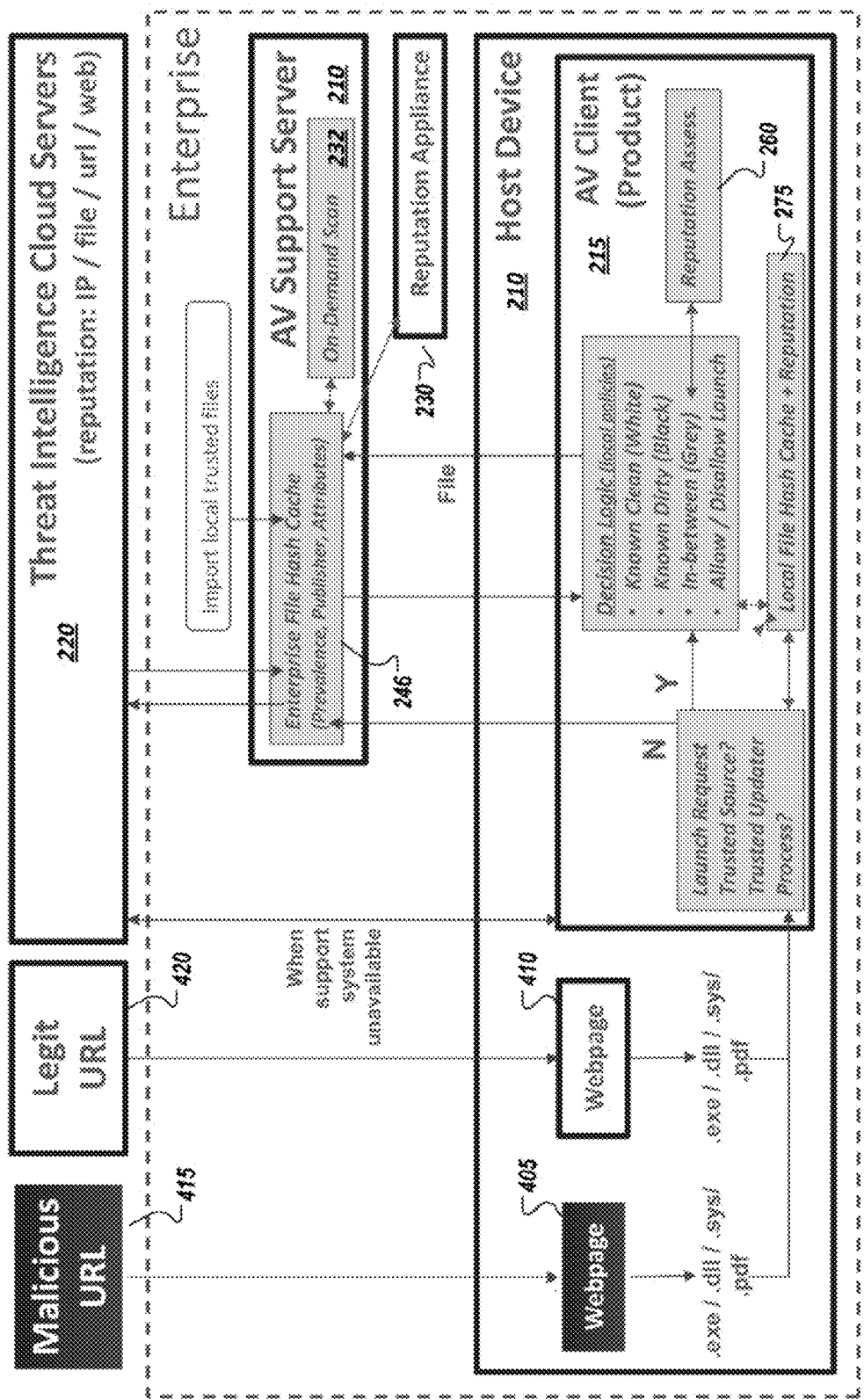
FIG. 4 is a simplified flow diagram illustrating example criticality assessments in a computing environment in accordance with one embodiment.

Turning to FIG. 4, a simplified block diagram is shown representing example functionality of an antimalware system including an antimalware (or antivirus) support system 205, an antimalware thin client 215 operating locally on a host device 210, together with one or more threat intelligence systems (e.g., 220). In the example of FIG. 4, antimalware client 215 can encounter a variety of files (e.g., 405, 410), including files originating from external sources, such as web servers (e.g., 415, 420). For instance, a file 410 can be detected by the antimalware client 215, and antimalware client 215 can apply the subset of detection and assessment provisioned on it to make a cursory assessment of the file 410. For instance, antimalware client can assess whether the source (e.g., 420) of the file 410 (or process associated with or provided through the file, such as an updater process) is trusted or not. Such a trust assessment can be based on identifying a certificate of the file 410 and comparing the certificate against, in some cases, a focused or limited listing of trusted certificates. In some implementations, at least a portion of a listing of trusted URLs, IP addresses, or other source information (e.g., 415, 420) determined for the domain can be available locally at the host device to further assist in assessing (e.g., in combination with the certificate listing) whether the source is to be trusted. If the antimalware client 215 possesses the requisite functionality to identify sufficient information from the file as well as access local data describing features of the file, including the file's source, the antimalware client 215 can apply rules, such as domain-specific rules, to determine whether to regard the file (e.g., 410) as known clean, known dirty, or grey, and whether to allow or disallow launch or loading of the file (e.g., using a reputation assessment engine (e.g., 260)). Additional information can also be assessed for the file 410, such as behaviors of the file and other information, for instance, identified from a local file cache 275 of the antimalware client 215 among other examples.

In instances where decision logic of the antimalware client 215 determines that it is unable to satisfactorily assess a file (e.g., 405, 410) based on its thin functionality set (or the focused content set (e.g., 275) available to it), antimalware client 215 can possess additional logic to query outside sources for assistance. For example, antimalware client 215 can engage antimalware support server 210, or, in cases when antimalware support server 210 is down or otherwise unavailable, query a threat intelligence system 220 in some examples.

Antimalware client 215 can assemble what information it can for a detected file and send this information to antimalware support system 210 as a query for additional intelligence. In some instances, all the antimalware client 215 may be able to provide is a hash of the file, while in other instances, functionality of antimalware client 215 may be able to assemble additional data describing various aspects of the file, such as whether or not the file was signed (or had a certificate), an identification (or copy) of any certificate, behaviors detected for the file, other information identifying a source of the file (e.g., a URL or IP address, etc.), among other information in accordance with the limited subset of functionality provisioned on the antimalware client 215.

Using at least the identification (e.g., a secure hash algorithm (SHA) hash) of the file, the antimalware support system 205 can attempt to identify additional information known concerning the file, including information described in file records or cache (e.g., 246) maintained by the antimalware support system 205, such as first contact data, file metric data, threat intelligence data, reputation score data, etc. As discussed above, antimalware support system can further utilize information obtained from the antimalware client 215 in its query in combination with the antimalware support system's own data describing the file to conduct a reputation assessment (e.g., using reputation engine 230) in connection with the query, among other examples. The antimalware support system 205 can return results for the query including additional information known for the file at antimalware support system 205 as well as reputation assessment data generated by the antimalware support system (or even reported by threat intelligence service 220). The antimalware client 215 can utilize this information (including consideration of the antimalware support system's (and/or threat intelligence system's) reputation assessment) to decide whether to launch or disallow the file locally at the host device 210. Further, in some instances, in connection with the decision to launch or disallow the file, antimalware client 215 may additionally process the various data (e.g., reputation data) returned in the query and complete its own reputation assessment (e.g., generation of a reputation score), among other examples.

Figure 5:
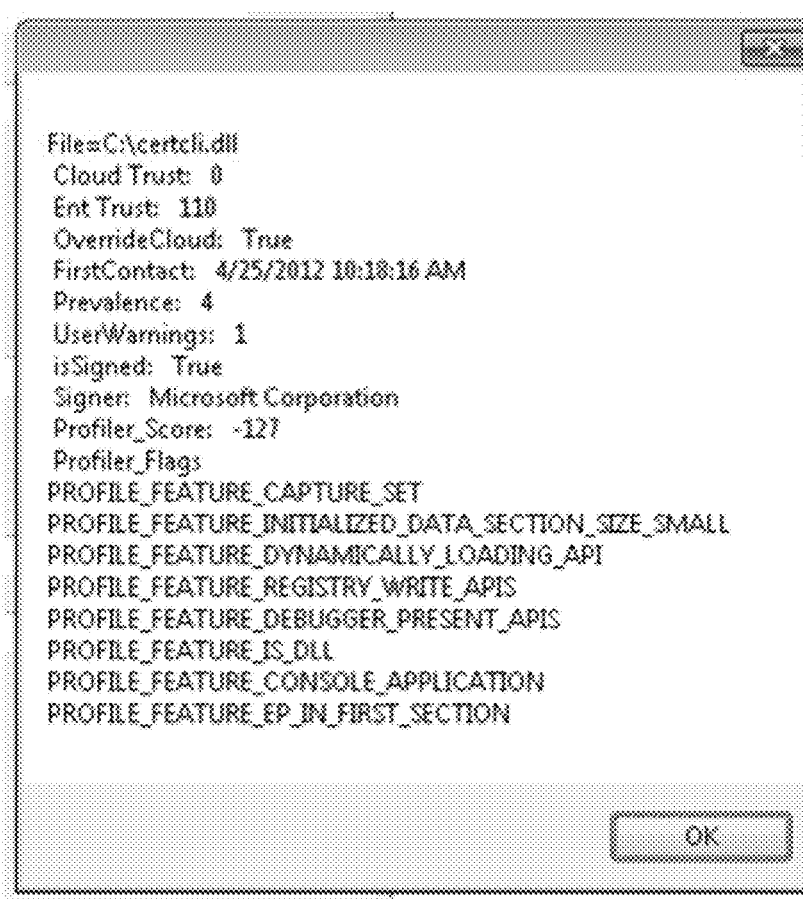
FIG. 5 is a simplified flow diagram illustrating further example criticality assessments in a computing environment in accordance with one embodiment.

Turning to FIG. 5, an example query response 500 of an antimalware support system is represented provided in response to a query of a particular file by an antimalware client local to a host device. As shown in the example of FIG. 5, a variety of information can be communicated in the query response corresponding to all or a portion of the information available at or through the antimalware support system with regard to a particular file. For instance, in this example, reputation data included in the query response 500 can include identified of the file, a trust or reputation level of a threat intelligence system, a trust or reputation level of an enterprise or domain (such as a reputation level or score computed by the antimalware support system), a value for whether domain reputation level or scores should override, preempt, or be preferred over the threat intelligence score (e.g., because different domain-specific (or -preferred) rules or reputation data are used in calculating the domain score, etc.), and so on. For example, additional reputation data can include a first contact date for the file, prevalence of the file in the domain (e.g., the number of different host devices in the domain that have identified the file), and whether a user warning or other user-provided negative feedback has been captured for the file. Certificate or signature information can also be identified in reputation data including whether the file is signed and by whom (e.g., the publisher). File behavior data can also be provided, such as a behavior-based score, flags identifying the respective behaviors detected for the file or other communication of the file's behaviors, among other examples.

Figure 6:
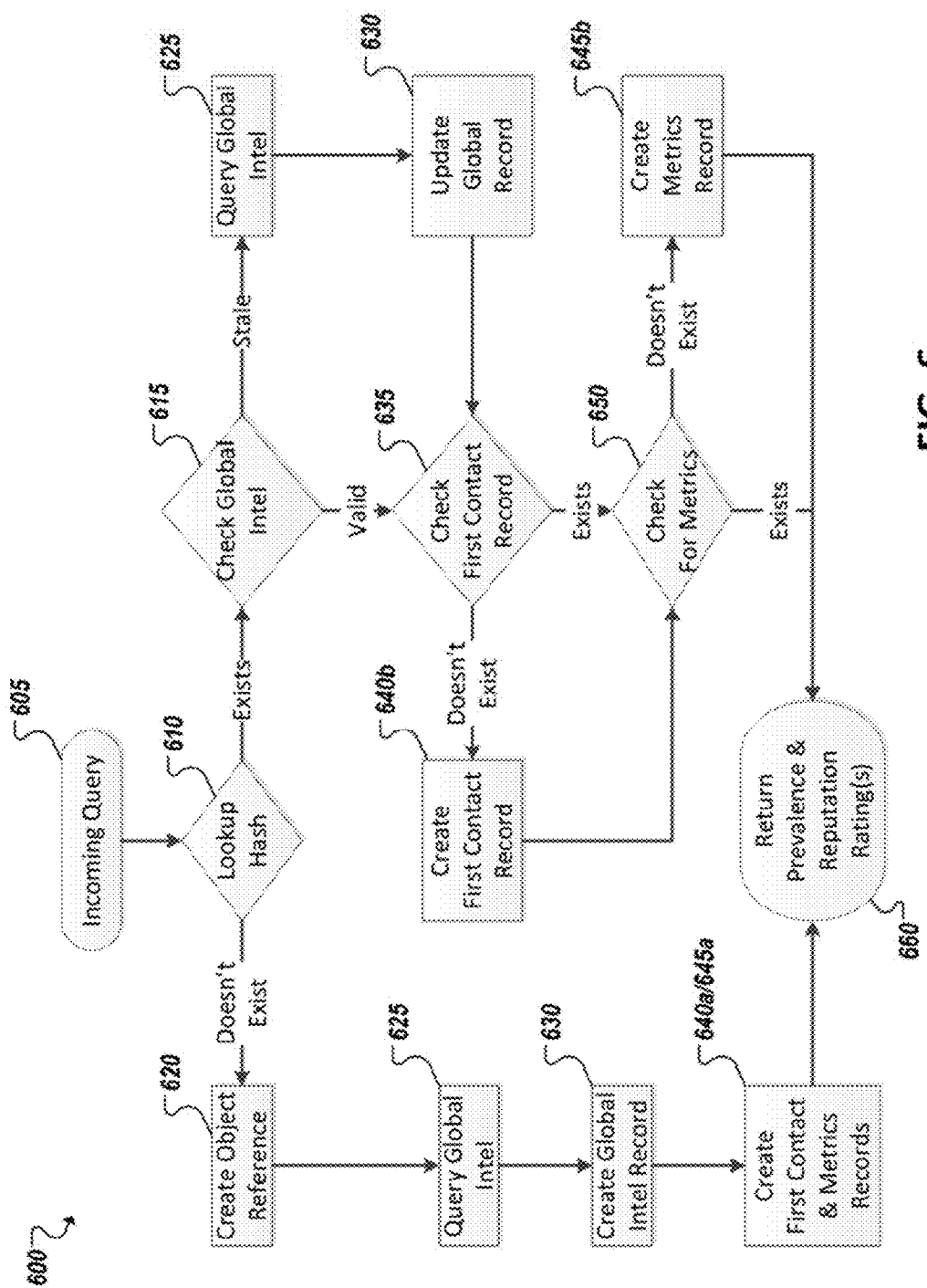
FIG. 6 is a flowchart representing example operations of an example antimalware support system in accordance with one embodiment.

Turning now to FIG. 6, a flowchart 600 is shown representing example techniques and operations of an example implementation of an antimalware support system (e.g., 205). An antimalware support system can assist thin antimalware clients provisioned on host devices within a domain managed by the antimalware support system in connection with queries received from the host device antimalware clients. For instance, a query can be received 605 from an antimalware client including data identifying one or more files, including executable and/or non-executable files and objects. In some instances, the query can include a hash of the file (such as a hash of the entirety or a portion of the file using MD5 or another cryptographic hash function) and the antimalware support system can determine whether records exist for the file based on a lookup 610. The lookup 610 can involve searching records and data maintained by the antimalware support system that are indexed by or otherwise include the hashes of files for which the antimalware support system maintains records. Such records and data can include reputation data of the respective file, including reputation data included in first contact data, file metric data, threat intelligence data, and other data or combinations thereof. Such data can be considered, in some implementations, the cache of the domain or antimalware support system.

In instances where the antimalware support system determines that a hash received in a query from an antimalware client matches one or more records maintained by the antimalware support system, the antimalware support system can attempt to identify (e.g., at 615, 635, 650) for reputation data for the file corresponding to the hash. In the instance that the antimalware support system determines that it has no records for the hash, antimalware support system can generate (e.g., at 620) a record for the file including the hash of the file. The antimalware support system can further query one or more global intelligence services, such as a third party threat intelligence service, that maintain records and reputation data relating to files as collected from multiple systems including, in some instances, systems in other domains and located (and functioning) across the world. The query 625 can include the hash of the file. In other instances, the antimalware support system can utilize or extract other identifiers for the file, for instance, from the hash or from the incoming query 605, to identify the file for the global intelligence service. If any reputation information or other information is returned for the file in response to the query of the global intelligence service, the antimalware support system can add the received information as data to one or more records generated (e.g., at 620) by the antimalware support system for the file. For instance, information received in data returned from the query 625 can incorporated (e.g., at 630) in threat intelligence data (e.g., 375). In one implementation, a global intelligence data record can be generated (e.g., at 630) based on the results of query 625, among other examples. The generated record (or data) (e.g., at 630) can be used to not only add to the knowledge base of the antimalware support system and respond to the incoming query 605 but can also serve as an identifier, in some instances, of the last query of the global intelligence service by the antimalware support system regarding the particular file referenced by the hash. For example, in a subsequent query involving the file, the antimalware support system can determine when the latest query of a particular threat intelligence system (or other global intelligence system) was with regard to the file and, in some cases, limit queries to the threat intelligence system when it is determined that the last query was sufficiently recent and fresh, among other examples.

In addition to querying one or more global intelligence systems for information concerning a file, an example antimalware support system can further create records (e.g., 640a, 645a) based on information available at the antimalware support system or elsewhere in the antimalware support system's domain relating to the file. In some instances, the information can include the information received from the host device in the query 605, such as the time the host device identified the file, events surrounding the identification of the file by the host device (e.g., other files running on the host device that may have caused the file to be downloaded or delivered, a URL or IP address associated with the file, etc.), identification of the host device, behaviors of the file identified by the antimalware client local to the reporting host device, user feedback received in connection with the file at the host device, and so on. Additionally, in some instances, the antimalware support system can collect data from other tools and sensors available to it in the domain and with information potentially describing the events leading up to or otherwise associated with reporting host device's encounter with the file, such as firewalls, internet gateways, email gateways, among other examples. Such information can be correlated with the query 605 and included in additional records and reputation data generated (e.g., at 640a, 645a) by the antimalware support system, among other examples. Further, in some instances, the antimalware support system can perform one or more scans on a copy of the file (e.g., in instances when a copy of the file is included in, derivable from, or accessible based on the information received in the query 605), to identify additional reputation data for inclusion in records, such as first contact records, metrics records, and so on.

Information generated (e.g., at 620, 630, 640a, 645a) by the antimalware support system in response to identification of a previously unknown file can be further utilized to generate 660 a reputation rating by the antimalware support system in some instances. Reputation ratings or scored generated by the antimalware support system can be further added to or otherwise incorporated in records concerning the file and maintained by the antimalware support system. Further, the antimalware support system can build a response to the query 605 that includes some or all of the reputation data gathered and generated (e.g., 620, 625, 630, 640a, 645a) by the antimalware support system, including prevalence data, reputation scores generated by the antimalware support system (or retrieved from a global intelligence system), whether the file represents a first contact, and so on. In some instances, the antimalware support system can identify the antimalware client and/or host device sending the query 605 and determine, from this identification, what data is stored or otherwise utilized by the antimalware client on the host device. Further, an antimalware support system, in some implementations, can tailor the query response to the particular antimalware client (and cache records used and maintained by the antimalware client), so as to further promote efficient and targeted communications and data sharing between the antimalware support system and the various antimalware clients service by it, among other potential advantages. Antimalware clients can act upon this information, for instance, to determine whether to allow or deny the file to load or launch on the host device, as well as whether and how to remediate the file from the host device, among other uses and examples.

In instances where the antimalware support system determines (e.g., at 610) that records are available that correspond to a particular hash identified in a query 605, the antimalware support system can query one or more different records, databases, and other data structures to identify reputation data corresponding to the host identified with the particular hash. For example, antimalware support system can check 615 global intelligence records (e.g., threat intelligence data 375) and determine whether the identified data is stale or not (e.g., by referencing a last queried value or other information identifying the last time the antimalware support system queried or otherwise received data from a particular global intelligence system relevant to the file. If the antimalware support system determines that the global intelligence is stale, the antimalware support system can initiate a new query 625 of the global intelligence service to potentially identify updated information for the file from the global intelligence service. Any new information obtained from the query 625 can be used to update 630 records including the global intelligence data.

Upon determining that the antimalware support system has access to sufficiently up-to-date global intelligence data for a file (if such data is even available from the service), the antimalware support system can check other data and/or records, such as first contact records (e.g., at 635) and/or file metric data (e.g., at 650) associated with the file at the antimalware support system to identify still additional reputation data for the file that is relevant to the query 605.

In the particular example of FIG. 6, antimalware support system 645b can build or add reputation data to records corresponding to the file. Such data can include one or both of information received from the query 605 describing the results of scans and other information obtained for the file at the host device responsible for the query 605 as well as from information results from scans of the file based at the antimalware support system or scanner accessible to and/or under the control of the antimalware support system including, in some implementations, third party scanner services and other examples. Based on the reputation data for the file included in global intelligence data (e.g., 615), first contact records (e.g., 635), metric data (e.g., 650) and other information and reputation data describing the behaviors, spread, use, and other characteristics of a file can all be considered against the rules set for the domain to return 660 a reputation score or level value to the host device along with portions (or all) of the reputation data for the file. The host device can then use this information to supplement the information it was able to obtain, for instance, using its local thing antimalware client, to reach a decision with regard to how the host device should handle or even load the file, among other examples.

As noted above, in response to receiving result data from a query of an antimalware support system, as in the example of FIG. 6, an antimalware client can not only direct handling of one or more corresponding files by the host device based on the query results, but the antimalware client can update its own records for the file to include the information obtained from the antimalware support system's query results. Additionally, the antimalware client can update its records to reflect the decision it reached based on the reputation data returned in the antimalware support system's query results.

An antimalware client can utilize feedback received from an antimalware support system to decide whether to allow a particular file to load or launch on the antimalware client's host device or not. In some instances, a decision not to load a particular file can further involve remediation of the file. In some instances, an antimalware client may lack data and functionality, such as virus definition and remediation files, remediation engines, and the like, as such functionality and data can consume an undesirably (or even prohibitively) large footprint in order to comprehensively address the myriad of potential malware that might affect the host device. In some implementations, an antimalware client may be provisioned with a base remediation engine capable of running particular scripts and performing other basic remediation tasks. Remediation functionality of the antimalware client may be, in some implementations, at least partially dependent on remediation support provided through the antimalware support system. Indeed, in some implementations, antimalware client may lack the capability to address at least certain types of remediations without the support of the antimalware support system.

In some instances, an example antimalware client can determine that a particular file should be remediated from a host device. Such a determination can be in response to a decision to block or disallow loading of a particular file based on reputation data for the particular file provided in local cache of the antimalware client and/or provided in response to a query of the and extensibility of the antimalware support system. In some instances, an antimalware support system can determine for the antimalware client that remediation of a file should take place, for instance, based on a query from the antimalware client involving the file, a reported decision or action taken on a file by the antimalware client (whether or not based on a query of the antimalware support system), among other instances. Indeed, in one example implementation, an antimalware client can report a decision to disallow loading of a particular file on a host device to the antimalware support system along with a remediation query requesting guidance on proper remediation of the file. In some implementations, the ability to simply delete the file using a traditional file delete operation may be available at the host device to be triggered directly by the antimalware client. In some instances, the antimalware client can attempt to perform a delete (or another basic remediation function) based on the reputation data it has access to for the file (e.g., from its local cache or query results from the antimalware support system). In other instances, the antimalware support system can identify to the antimalware client that a particular file can be remediated using one or more functions available locally at the host device and cause the antimalware client to initiate and cause these functions to be performed to at least partially remediate the file, among other examples.

In other instances, the host device may lack the functionality to fully or partially remediate a particular file. Such a conclusion can be reached, for example, based on the failure of unilateral (or antimalware support system-directed) attempts by the antimalware client to remediate the file. In other instances, the antimalware support system, in connection with a query involving the file from the antimalware client, can identify for the antimalware client that remediation of the file is not supported at the antimalware client or host device. In either instance, the antimalware support system can be invoked to assist the antimalware client (and its host device) with remediation of a particular file using functionality provided, at least in part, at the remote the antimalware support system.

Figure 7A:
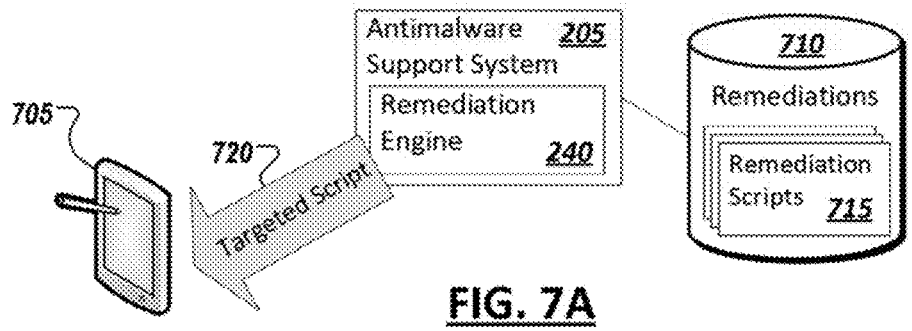
FIGS. 7A-7C are simplified block diagrams illustrating examples of remote remediation assistance utilizing an example antimalware support system in accordance with some embodiments.

Turning to the example of FIG. 7A, a simplified block diagram is shown representing one example form of remediation assistance that can be provided using an antimalware support system (e.g., 205). In traditional malware tools, a host device may be provided with an antimalware tool utilizing virus definition files which not only include substantially comprehensive definition data for use in detecting any one of the myriad of malware threats that may exist that is known by a vendor associated with the malware tool, but the antimalware tool, for instance, through its virus definition files, may also possess comprehensive remediation functionality ideally providing the best known remediation of any of the malware threats it might be able to detect.

An example thin antimalware client, in some implementations, may include a remediation engine capable of executing, directing, invoking, or otherwise causing one or more malware remediation scripts to be run locally on the host device to provide targeted remediation of a detected malicious file. Rather than burdening the host device with a resource-heavy tool with comprehensive functionality, some of which may never be used, the thin antimalware client can obtain antimalware scripts, for instance, from the antimalware support system on an as-needed basis. Further, in some implementations, after receiving and using a targeted malware remediation script, the host device can dispose of the script to reserve computing resources on the host device for other programs and processes, as well as, in some cases, other malware remediation scripts for other malware issues on the host device.

In the example of FIG. 7A, an example antimalware support system 205 can host a substantially comprehensive set of antimalware scripts each configured, when executed, to perform malware remediation functions and actions on a host device (e.g., with a remediation engine and/or antimalware client, etc.). The substantially comprehensive set can include scripts that have been developed for or are known to be effective in remediating certain malicious files known to the antimalware support system. Such malicious files can be identified by the hash value of the file. Indeed, reputation data for malicious files can be maintained along with reputation data for all other files identified for the domain by the antimalware support system. A library of remediation records (e.g., 710) can also be maintained by an example antimalware support system 205. The library of remediation records can include, in some implementations, a library or set of the remediation scripts 715. Remediation records can identify specific files to which particular remediation scripts or other remediation techniques at least potentially apply. For instance, records maintained for a file can point to a remediation technique that includes execution of one or more remediation scripts 715 on a host device. In another example, malicious behaviors or other reputation data or combinations of reputation data values can be associated with a type or class of file and this combination of features can be associated with one or more remediation techniques. Such an approach can be used, for example, to predictably identify a remediation technique for a new or previously unknown file for which a remedy has potentially not yet been developed. Based on behaviors and characteristics of the file identified by the antimalware support system, supported antimalware clients, other domain security tools, etc., a remediation technique can be identified, from remediation records 710, as likely applicable to the file and the identified remediation techniques can be attempted on the file, among other examples.

In some implementations, an antimalware support system 205 can receive a request for remediation assistance from an antimalware client on a host device 705. Such a request, in some instances, can be in response to the antimalware client determining that it lacks remediation functionality for addressing a particular malicious file, or determining that attempts to remediate the malicious file using its own functionality has been unsuccessful, among other potential examples. In other instances, remediation of a file can be determined at least partially by the antimalware support system. For example, a reputation assessment of a file that is the subject of an antimalware client's query of the antimalware support system 205 can result in an identification that the file is malicious and should be remediated. In other instances, the antimalware client can make such a determination.

Further, in some instances, the antimalware support system 205 can identify for the antimalware client whether remediation of a particular file (e.g., identified in a query or other request of the antimalware support system 205) should involve the antimalware support system 205. For example, as noted above, the antimalware support system 205 can query its remediation records 710 to identify one or more remediation techniques that can be caused to be applied to the host device 705 by the antimalware support system 205. In some instances, the antimalware support system 205 may identify one or more remediation scripts 715 identified as good candidates for remediating a particular identified file encountered by a given host device. Additionally, the selection of a particular remediation technique, including remediation scripts 715, can be based as well on the characteristics or type of the host device requesting remediation assistance (as well as the type of remediation client). For instance, an antimalware support system 205 can maintain multiple versions of a particular remediation script adapted to perform a set of remediation actions on a host device. For example, remediation techniques can be specific or tailored to particular operating systems, chipsets, device capabilities, etc., and the antimalware support system 205 can assess remediation records 710 and data from the antimalware client requesting assistance to identify the nature of the file to be remediated as well as the character of the host device to be assisted to identify corresponding remediation techniques for the situation.

In one example implementation, a remediation engine 240 of an antimalware support system 205 can select one or more reputation techniques for remediation of a particular file on a particular device. In some instances, this can include identification of one or more remediation scripts (e.g., 720) from the library of remediation scripts 715 that can be served over a network to a local antimalware client on the host device (e.g., 705), for use by the local antimalware client. The antimalware client, in one example, can utilize functionality, such as a common remediation script execution engine capable of directing execution of potentially any one of the remediation scripts 715 of the antimalware support system 205 on the host device. In the example of FIG. 7A, the received targeted remediation script 720 can be run on the host device 705 to attempt to remediate a particular file. Following execution of the focused remediation script 720, the script 720 and can be dissolved or removed by the host device 705. Subsequent targeted remediation scripts can be handled accordingly as well by the host-based antimalware client and dissolved or deleted from the host device's local memory following the antimalware client's use of the remediation script, among other examples.

The antimalware client can further include functionality for assessing the effects of the execution of one or more remediation scripts (or the performance of any variety of remediation techniques) on a particular file. The antimalware client can report its findings to the antimalware support system 205. Feedback from an antimalware client local to a host device (e.g., 705) can be used by the antimalware support system 205 to determine whether additional remediation techniques, including additional remediation scripts, should be utilized. In some instances, a set of remediation techniques can be associated with a particular file. In some implementations, such a set can further include an order in which the remediation techniques should be performed. The set of remediation techniques can include multiple remediation techniques that are to always to be performed together (e.g., in parallel and/or series) and/or remediation techniques that are only to be performed upon reported failure of another remediation technique in the set, among other examples. Such sets of remediation techniques can further include remediation techniques involving the provision of one or more remediation scripts 715 on a host device by the antimalware support system 205 as well as other combinations of different remediation technique types, including such techniques as described in the following examples of FIGS. 7B and 7C, among other examples.

Figure 7B:
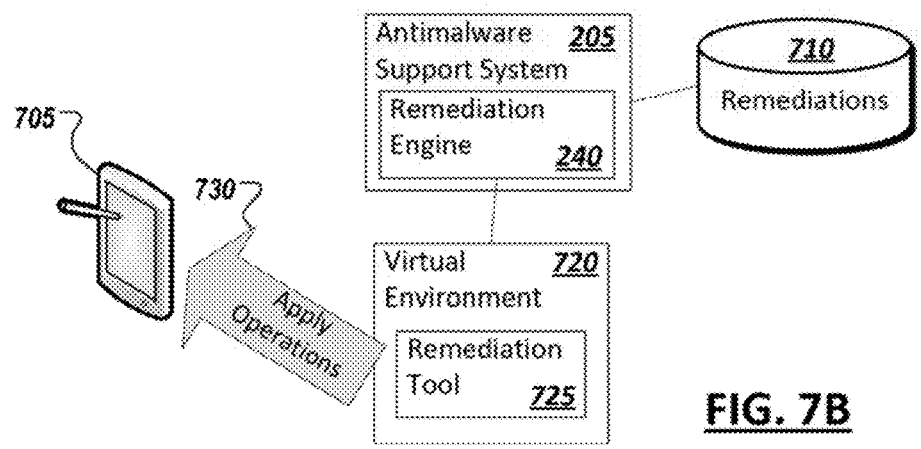

Turning to FIG. 7B, a simplified block diagram is shown representing another example form or type of remediation assistance that can be provided using an antimalware support system (e.g., 205). As noted above, such techniques can be performed in combination with other remediation techniques, such as those described in connection with the examples of FIG. 7A, to remedy a single, particular file, among other examples. In the example of FIG. 7B, a virtual environment 720, such as a virtual machine-based environment, can be provided in connection with a remediation engine 240 of an example antimalware support system 205. One or more remediation techniques identified in remediation records 710 for a file can be executed within the virtual environment 720, for instance, by provisioning a remediation tool 725 within the virtual environment 720 and executing the remediation tool 725 within the virtual environment 720. Example remediation tools can include malware, spyware, and virus removal tools (including antimalware suites that include such removal tools), among other examples. Operations of the remediation tool can be redirected to be performed 730 on resources of the host device (e.g., 705). For example, operations of the remediation tool 725 involving file or registry access can be redirected to be performed 730 on the files, registries, etc. of a particular host device 705. Redirection of the operations can be performed, for example, through interception of the operations instantiated and run from the virtual environment 720 and redirection of the operations to an agent on the antimalware client of the host device 705, among other example implementations. In effect, the virtual environment 720 acts as a proxy for the host device in hosting and executing a particular remediation tool 725 on behalf of and at the benefit of the host device.

In some instances, utilizing a virtual environment 720 to execute a particular remediation tool 725 and point operations of the remediation tool 725 to a remote host device (e.g., 705) can be advantageous for a variety of reasons including instances where the resources (e.g., memory, processing power, etc.) for execution or hosting of the particular remediation tool 725 exceed those available (or desirable) for the target host device. Further, some remediation tools 725 may possess functionality that potentially conflicts with other tools and functionality of a host device, among other potential incompatibilities between a particular remediation tool 725 and a target host device 705. Virtual, or proxy, execution of the particular remediation tool 725 may be particularly desirable however for remediating a particular file or file type found on the host device.

In some implementations, remediation techniques identified for remediation of a particular file on a particular host device by an antimalware support system 205 can include executing multiple remediation tools (e.g., 725) within virtual environments controlled by the antimalware support system 205. In some instances, a combination or battery of remediation tools (e.g., 725) can be identified as candidates for resolving a particular file and multiple remediation tools, including remediation tools of the same type (e.g., an antivirus removal tool from one vendor and an antivirus removal of a second vendor), can be run against a particular host device (e.g., 705) to remediate a particular file, among other examples.

Figure 7C:
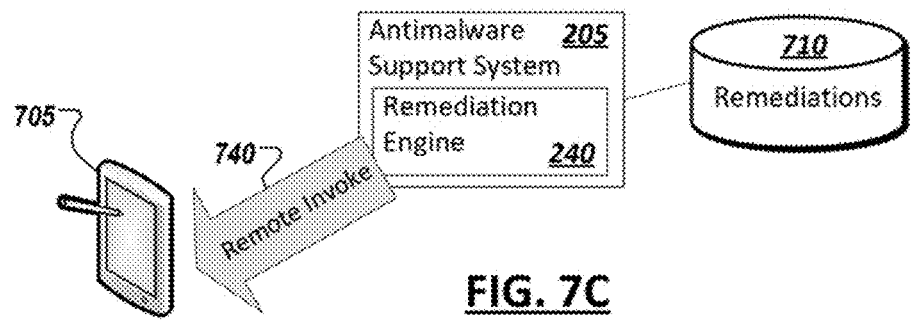

In the example of FIG. 7C, a simplified block diagram is shown representing a further example form of remediation assistance that can be provided using an antimalware support system (e.g., 205). In some implementations, an antimalware support system 205 can remotely invoke 740 certain processes available at the host device 705 in connection with the remediation of malware on the host device 705. Further, as noted above, such remotely-invoked remediation techniques can be performed in addition to or in concert with other remediation techniques, including techniques applying at least some of the principles described above, for instance, in connection with FIGS. 7A and 7B. In one example, a remediation engine 240 of an example antimalware support system 205 can remotely boot the host device and cause the host device 705 to boot to a (e.g., clean) recovery disk image, such as a recovery disk image hosted by antimalware support system 205 or elsewhere on the domain. The recovery disk image can include logic that can then be allowed to remediate and clean the host device locally. In another example, antimalware support system 205 can remotely trigger a virtual machine image restore, among other examples.

It should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

FIGS. 8A-8D are simplified flowcharts 800a-d illustrating example techniques involving an antimalware support system supporting one or more antimalware clients on host devices remote from the antimalware support system. For example, in the example of FIG. 8A, an opportunity can be identified 805 to assist a particular host device with remediation of a file on the host device. The opportunity can be identified, for instance, in connection with a query of an antimalware support system by the host device relating to the file. The antimalware support system can determine that the file is malicious or otherwise deserving of remediation in connection with the generation of a response to the query. In some instances, assistance with remediation can be unilaterally performed by the antimalware support system in connection with the determination that remediation of the file is warranted, among other examples. For instance, in other examples, a host device can explicitly request assistance from the antimalware support system, such as in instances where the host device determines that the file is untrustworthy (e.g., based on local reputation data or other reputation for the file returned, for instance, in response to a query of an antimalware support system, etc.).

A remediation procedure can be determined for remediation of the file on the particular host device. Such remediation procedures can be tailored to remediating that particular file on that particular host device. In other words, different remediation procedures can be defined for remediation of different files or remediation on different host devices, etc. Remediation procedures can include multiple different remediation tasks that can be performed sequentially or in parallel to remediate a file.

In the example of FIG. 8A, a remediation task can include the provision of particular remediation scripts. Each remediation script can include logic tailored specifically to a particular task or remediation of a particular file, etc. Such remediation scripts can be provisioned on host devices on an as-needed basis. For instance, a remediation script can be determined 810 that is appropriate for remediating the file from the particular host device. This remediation script can be one of many remediation scripts that can be potentially selected and provisioned on a host device in connection with remediation of a variety of different files. The selected remediation script can then be provided 815 to the host device for execution on the host device. The host device can include an engine capable of executing any of a variety of different remediation scripts that can be provided by the antimalware support system. Upon execution of the remediation script, the remediation script can be dissolved. Further, the host device can provide feedback data to the antimalware support system indicating whether the remediation task was effective. This feedback can be used to inform future determinations of whether to apply a particular remediation task (e.g., selection of a remediation script) in connection with an opportunity to assist a host device with remediation of a particular file, among other examples and features.

Turning to FIG. 8B, a file can be identified 820 on a host device, for instance, using a local antimalware client. It can be determined 825 that the file should be remediated, such as in instances where the reputation or identified characteristics of the file indicate that the file is potentially malicious or risky. In some instances, the host device can possess functionality for remediating a file. In other instances, however, it can be determined that the host device possesses insufficient remediation functionality to remediate the identified file. For instance, a host device can utilize a thin antimalware client that possesses minimal remediation functionality and relies heavily on support provided by antimalware support systems. The host device, for instance, using its antimalware client, can initiate 830 remediation support of an antimalware support system. Initiating 830 such support can include, for instance, sending a query identifying the file, explicitly requesting remediation assistance, sending results of a decision to block the file, among other examples. Accordingly, in some instances, the antimalware support system can send a remediation script it identifies as capable of at least partially remediating the identified file. The remediation script can be received 835 at the host device and executed 840 on the host device, such as through an engine of the antimalware client capable of executing such scripts received from the antimalware support system. Further, in some implementations, the host device can dispose 845 of the received remediation script following execution 840 of the remediation script, such as after it is confirmed that the execution 840 of the remediation script successfully remediating the file, among other examples.

Turning now to FIG. 8C, an opportunity to assist with remediation of a file on a host device can be identified 850 and a remediation tool can be determined or identified 855 as being a candidate for remediating the file. The use of such a remediation tool can be included in a remediation procedure determined for the combination of the file and the particular host device. The remediation tool can be launched 860 in a virtual environment hosted by a computing device remote from the host device. In other words, the identified remediation tool is to be executed remote from the host device, although the remediation tool is to be specifically executed so as to remediate the file local to the host device. This can be accomplished by causing 865 the operations of the remediation tool to be applied to resources of the host device, such as memory, registries, files, etc. of the host device. In some instances, the host device can be provided with an agent, such as an agent implemented through a local antimalware client, to facilitate redirection of the operations of the remediation tool on the resources of the host device. Thus, remote execution of the remediation tool can effect remediation of the file on the host device.

Further, as shown in the example of FIG. 8D, some remediation tasks included in a remediation procedure determined for remediation of a particular file on a particular host device can be performed locally on a host device but be triggered remotely using an antimalware support system. For instance, an opportunity to assist with remediation of a file on a host device can be identified 870 and a remediation procedure can be determined 875. Some tasks in the remediation procedure can be performed locally on a host device but be triggered remotely. Accordingly, such tasks can be initiated 880 remotely, for instance, by an antimalware support system, to trigger performance of the remediation task at the host device. For instance, an antimalware support system can perform a remote boot of the host device or remotely trigger a virtual machine image restore of the host device, among other potential examples.

Figure 10:
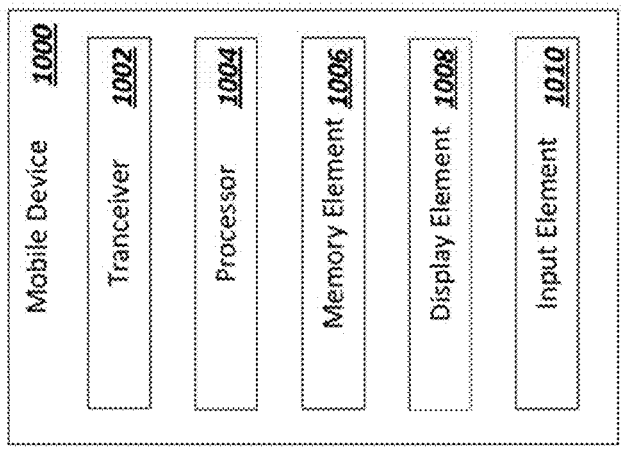
FIG. 10 is a block diagram of an exemplary mobile device system in accordance with one embodiment.
Figure 9:
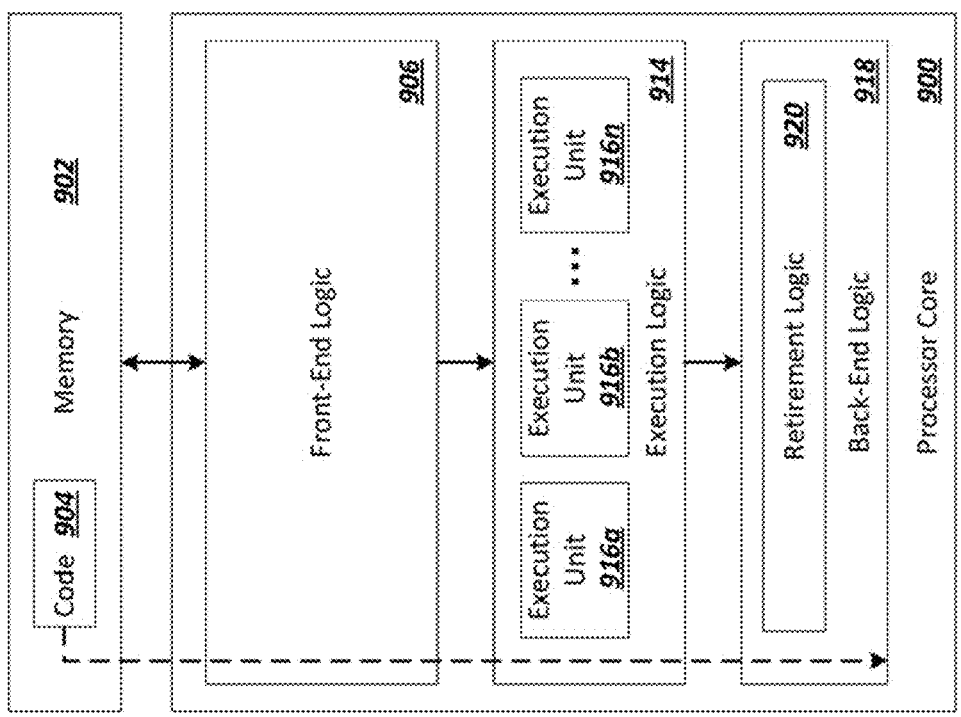
FIG. 9 is a block is a block diagram of an exemplary processor in accordance with one embodiment.
Figure 11:
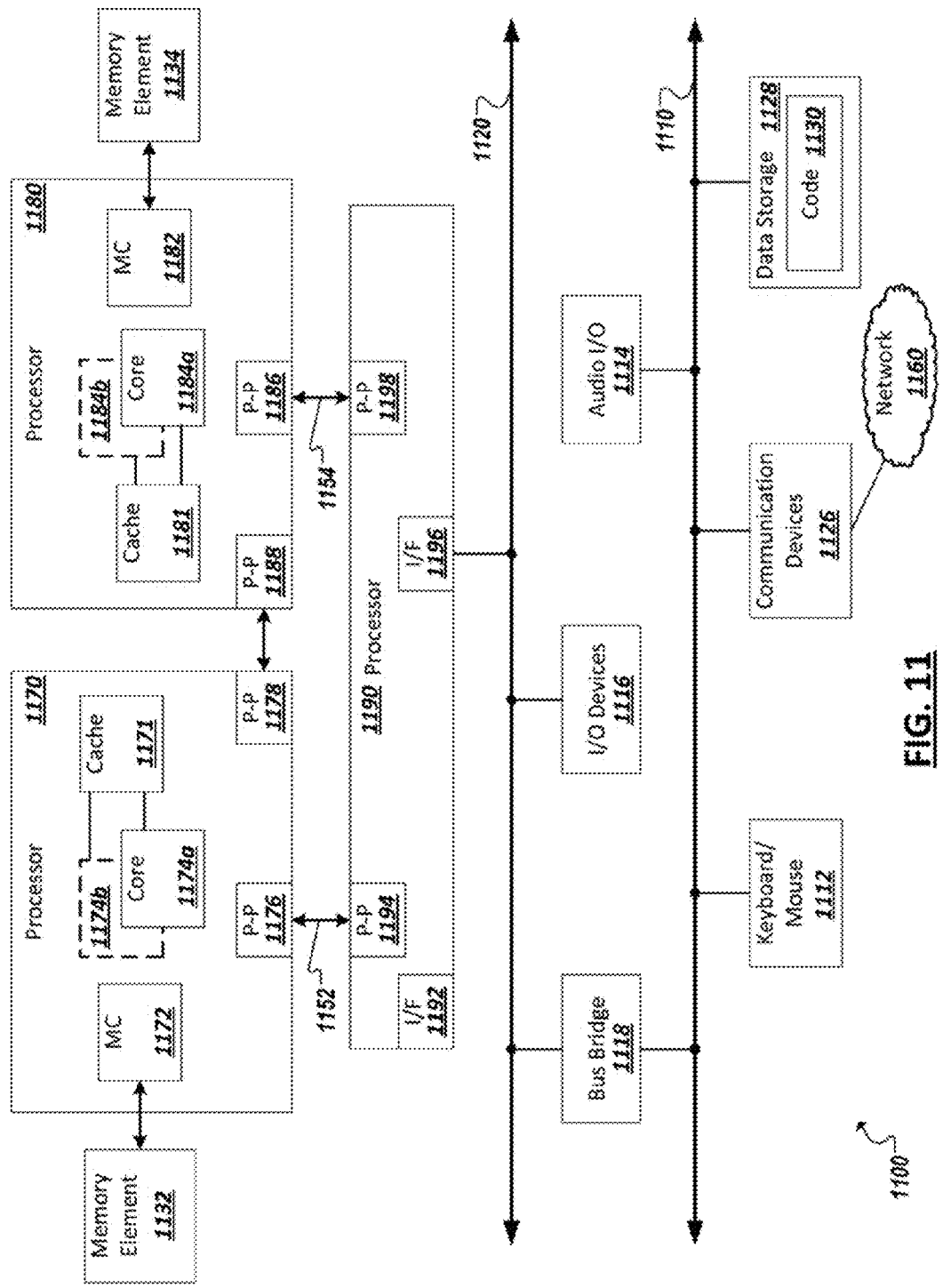
FIG. 11 is a block diagram of an exemplary computing system in accordance with one embodiment Like reference numbers and designations in the various drawings indicate like elements.

FIGS. 9-11 are block diagrams of exemplary computer architectures that may be used in accordance with embodiments disclosed herein. Other computer architecture designs known in the art for processors, mobile devices, and computing systems may also be used. Generally, suitable computer architectures for embodiments disclosed herein can include, but are not limited to, configurations illustrated in FIGS. 9-11.

FIG. 9 is an example illustration of a processor according to an embodiment. Processor 900 is an example of a type of hardware device that can be used in connection with the implementations above.

Processor 900 may be any type of processor, such as a microprocessor, an embedded processor, a digital signal processor (DSP), a network processor, a multi-core processor, a single core processor, or other device to execute code. Although only one processor 900 is illustrated in FIG. 9, a processing element may alternatively include more than one of processor 900 illustrated in FIG. 9. Processor 900 may be a single-threaded core or, for at least one embodiment, the processor 900 may be multi-threaded in that it may include more than one hardware thread context (or "logical processor") per core.

FIG. 9 also illustrates a memory 902 coupled to processor 900 in accordance with an embodiment. Memory 902 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 900 can execute any type of instructions associated with algorithms, processes, or operations detailed herein. Generally, processor 900 can transform an element or an article (e.g., data) from one state or thing to another state or thing.

Code 904, which may be one or more instructions to be executed by processor 900, may be stored in memory 902, or may be stored in software, hardware, firmware, or any suitable combination thereof, or in any other internal or external component, device, element, or object where appropriate and based on particular needs. In one example, processor 900 can follow a program sequence of instructions indicated by code 904. Each instruction enters a front-end logic 906 and is processed by one or more decoders 908. The decoder may generate, as its output, a micro operation such as a fixed width micro operation in a predefined format, or may generate other instructions, microinstructions, or control signals that reflect the original code instruction. Front-end logic 906 also includes register renaming logic 910 and scheduling logic 912, which generally allocate resources and queue the operation corresponding to the instruction for execution.

Processor 900 can also include execution logic 914 having a set of execution units 916a, 916b, 916n, etc. Some embodiments may include a number of execution units dedicated to specific functions or sets of functions. Other embodiments may include only one execution unit or one execution unit that can perform a particular function. Execution logic 914 performs the operations specified by code instructions.

After completion of execution of the operations specified by the code instructions, back-end logic 918 can retire the instructions of code 904. In one embodiment, processor 900 allows out of order execution but requires in order retirement of instructions. Retirement logic 920 may take a variety of known forms (e.g., re-order buffers or the like). In this manner, processor 900 is transformed during execution of code 904, at least in terms of the output generated by the decoder, hardware registers and tables utilized by register renaming logic 910, and any registers (not shown) modified by execution logic 914.

Although not shown in FIG. 9, a processing element may include other elements on a chip with processor 900. For example, a processing element may include memory control logic along with processor 900. The processing element may include I/O control logic and/or may include I/O control logic integrated with memory control logic. The processing element may also include one or more caches. In some embodiments, non-volatile memory (such as flash memory or fuses) may also be included on the chip with processor 900.

Referring now to FIG. 10, a block diagram is illustrated of an example mobile device 1000. Mobile device 1000 is an example of a possible computing system (e.g., a host or endpoint device) of the examples and implementations described herein. In an embodiment, mobile device 1000 operates as a transmitter and a receiver of wireless communications signals. Specifically, in one example, mobile device 1000 may be capable of both transmitting and receiving cellular network voice and data mobile services. Mobile services include such functionality as full Internet access, downloadable and streaming video content, as well as voice telephone communications.

Mobile device 1000 may correspond to a conventional wireless or cellular portable telephone, such as a handset that is capable of receiving "3G", or "third generation" cellular services. In another example, mobile device 1000 may be capable of transmitting and receiving "4G" mobile services as well, or any other mobile service.

Examples of devices that can correspond to mobile device 1000 include cellular telephone handsets and smartphones, such as those capable of Internet access, email, and instant messaging communications, and portable video receiving and display devices, along with the capability of supporting telephone services. It is contemplated that those skilled in the art having reference to this specification will readily comprehend the nature of modern smartphones and telephone handset devices and systems suitable for implementation of the different aspects of this disclosure as described herein. As such, the architecture of mobile device 1000 illustrated in FIG. 10 is presented at a relatively high level. Nevertheless, it is contemplated that modifications and alternatives to this architecture may be made and will be apparent to the reader, such modifications and alternatives contemplated to be within the scope of this description.

In an aspect of this disclosure, mobile device 1000 includes a transceiver 1002, which is connected to and in communication with an antenna. Transceiver 1002 may be a radio frequency transceiver. Also, wireless signals may be transmitted and received via transceiver 1002. Transceiver 1002 may be constructed, for example, to include analog and digital radio frequency (RF) 'front end' functionality, circuitry for converting RF signals to a baseband frequency, via an intermediate frequency (IF) if desired, analog and digital filtering, and other conventional circuitry useful for carrying out wireless communications over modern cellular frequencies, for example, those suited for 3G or 4G communications. Transceiver 1002 is connected to a processor 1004, which may perform the bulk of the digital signal processing of signals to be communicated and signals received, at the baseband frequency. Processor 1004 can provide a graphics interface to a display element 1008, for the display of text, graphics, and video to a user, as well as an input element 1010 for accepting inputs from users, such as a touchpad, keypad, roller mouse, and other examples. Processor 1004 may include an embodiment such as shown and described with reference to processor 900 of FIG. 9.

In an aspect of this disclosure, processor 1004 may be a processor that can execute any type of instructions to achieve the functionality and operations as detailed herein. Processor 1004 may also be coupled to a memory element 1006 for storing information and data used in operations performed using the processor 1004. Additional details of an example processor 1004 and memory element 1006 are subsequently described herein. In an example embodiment, mobile device 1000 may be designed with a system-on-a-chip (SoC) architecture, which integrates many or all components of the mobile device into a single chip, in at least some embodiments.

FIG. 11 illustrates a computing system 1100 that is arranged in a point-to-point (PtP) configuration according to an embodiment. In particular, FIG. 11 shows a system where processors, memory, and input/output devices are interconnected by a number of point-to-point interfaces. Generally, one or more of the computing systems described herein may be configured in the same or similar manner as computing system 1100.

Processors 1170 and 1180 may also each include integrated memory controller logic (MC) 1172 and 1182 to communicate with memory elements 1132 and 1134. In alternative embodiments, memory controller logic 1172 and 1182 may be discrete logic separate from processors 1170 and 1180. Memory elements 1132 and/or 1134 may store various data to be used by processors 1170 and 1180 in achieving operations and functionality outlined herein.

Processors 1170 and 1180 may be any type of processor, such as those discussed in connection with other figures. Processors 1170 and 1180 may exchange data via a point-to-point (PtP) interface 1150 using point-to-point interface circuits 1178 and 1188, respectively. Processors 1170 and 1180 may each exchange data with a chipset 1190 via individual point-to-point interfaces 1152 and 1154 using point-to-point interface circuits 1176, 1186, 1194, and 1198. Chipset 1190 may also exchange data with a high-performance graphics circuit 1138 via a high-performance graphics interface 1139, using an interface circuit 1192, which could be a PtP interface circuit. In alternative embodiments, any or all of the PtP links illustrated in FIG. 11 could be implemented as a multi-drop bus rather than a PtP link.

Chipset 1190 may be in communication with a bus 1120 via an interface circuit 1196. Bus 1120 may have one or more devices that communicate over it, such as a bus bridge 1118 and I/O devices 1116. Via a bus 1110, bus bridge 1118 may be in communication with other devices such as a keyboard/mouse 1112 (or other input devices such as a touch screen, trackball, etc.), communication devices 1126 (such as modems, network interface devices, or other types of communication devices that may communicate through a computer network 1160), audio I/O devices 1114, and/or a data storage device 1128. Data storage device 1128 may store code 1130, which may be executed by processors 1170 and/or 1180. In alternative embodiments, any portions of the bus architectures could be implemented with one or more PtP links.

The computer system depicted in FIG. 11 is a schematic illustration of an embodiment of a computing system that may be utilized to implement various embodiments discussed herein. It will be appreciated that various components of the system depicted in FIG. 11 may be combined in a system-on-a-chip (SoC) architecture or in any other suitable configuration capable of achieving the functionality and features of examples and implementations provided herein.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal per se, a computer storage medium can be a source or destination of computer program instructions encoded in an artificially generated propagated signal. The computer storage medium can also be, or be included in, one or more separate physical components or media (e.g., multiple CDs, disks, or other storage devices), including a distributed software environment or cloud computing environment.

In general, one aspect of the subject matter described in this specification can be embodied in methods and executed instructions that include or cause the actions of identifying an opportunity to assist with remediation of a file at a remote particular host device, determining one or more remediation scripts from a plurality of remediation scripts for remediation of the file, and providing the one or more remediation scripts to the particular host device for execution on the particular host device.

Another general aspect of the subject matter described in this specification can be embodied in systems that include a processor device, memory element, and an antimalware support server or system. The antimalware support server can be configured to identify a request for remediation of a file at a remote particular host device, determine one or more remediation scripts from a plurality of remediation scripts for remediation of the file, and provide the one or more remediation scripts to the particular host device for execution on the particular host device These and other embodiments can each optionally include one or more of the following features. The opportunity can be identified based on a query from the particular host device for additional reputation information for the file. The query can prompt a determination by an antimalware support system remote from the particular host device that the file should be remediated. Identifying the opportunity can include receiving a request for remediation of the file from the host device. The request for remediation can be based on a determination at the host device that the file should be remediated. The determination of the host device can be in response to receiving reputation information for the file from an antimalware support system remote from the particular host device. Accordingly, a query can be received from the particular host device and response data can be returned in response to the query that includes the reputation information. The plurality of remediation scripts can include other remediation scripts for remediation of other files. Another opportunity can be identified to assist with remediation of a second file on the particular host device or the same file on another host device. A different, second remediation script can be determined in the plurality of remediation scripts that corresponds to the other opportunity. Likewise, the second remediation script can be sent to the corresponding host device for execution on the host device. Feedback data can be collected from the host devices regarding results of the execution of the remediation scripts on the particular host device. Determining whether to use at least one of the one or more remediation scripts in response to a subsequent opportunity to remediate the file can be based at least in part on the feedback data.

Another general aspect of the subject matter described in this specification can be embodied in methods and executed instructions that include or cause the actions of identifying a file on a host device, determining that the file should be remediated, sending a request for remediation assistance to a remote antimalware support system, receiving one or more malware remediation scripts from the antimalware support system, and executing the scripts at the host device. The malware remediation scripts can be selected by the antimalware support system from a plurality of malware remediation scripts available to the antimalware support system.

These and other embodiments can each optionally include one or more of the following features. The file can be identified by an antimalware client on the host device and the remediation script can be executed using the antimalware client. It can be determined that the antimalware client lacks capability to perform a remediation of the file, and the request for remediation assistance can be sent based at least in part on the determination that the antimalware client lacks the capability. The antimalware client can be configured to remediate other files (i.e., without remediation assistance). The antimalware client can also be configured to execute any one of the plurality of remediation scripts provided by an outside source such as the antimalware support system. Remediation scripts can be disposed or deleted from the host device following execution of the remediation scripts. For instance, the remediation scripts can be disposed in response to identifying successful remediation of the file. A query can be sent to the antimalware support system for reputation information for the file more information and results can be received for the query from the antimalware support system. Determining that the file should be remediated can be based at least in part on the received results and can be further based on an assessment of the file using an antimalware client local to the host device. A second file can be identified on the host device that is determined should be remediated and a request for remediation of the second file can be sent. Further, a second malware remediation script can be received from the antimalware support system, the second malware remediation script not included in the one or more malware remediation scripts selected by the antimalware support system for the first file, and the second remediation script can be executed at the host device.

Another general aspect of the subject matter described in this specification can be embodied in methods and executed instructions that include or cause the actions of identifying an opportunity to assist with remediation of a file at a remote particular host device, determining a remediation tool for remediation of the file, launching the remediation tool on a computing device remote from the particular host device, and causing operations of the remediation tool to be applied to resources of the particular host device.

Another general aspect of the subject matter described in this specification can be embodied in systems that include a processor device, memory element, and an antimalware support server. The antimalware support server can be configured to identify an opportunity to assist with remediation of a file at a remote particular host device, determine a remediation tool for remediation of the file, launch the remediation tool on a computing device remote from the particular host device, and cause operations of the remediation tool to be applied to resources of the particular host device.

These and other embodiments can each optionally include one or more of the following features. Applying the operations of the remediation tool to the resources can remediate the file from the particular host device. Identifying the opportunity can include receiving a request for remediation of the file from the host device. The request for remediation can be based on a determination at the host device that the file should be remediated. The determination of the host device can be in response to receiving reputation information for the file from an antimalware support system remote from the particular host device. Accordingly, a query can be received from the particular host device and response data can be returned in response to the query that includes the reputation information. The remediation tool can be executed by the computing device. Further another opportunity to assist with remediation of the file at a second host device can be identified and a second remediation tool can be determined or identified for remediation of the file on the second host device, the second remediation tool is different from the remediation tool used for the particular host device. The second remediation tool can be launched on a computing device remote from the second host device and operations of the second remediation tool can be applied to resources of the second host device to remediate the file. Similarly, an opportunity to assist with remediation of a different, second file on the particular host device can be identified and another remediation tool, different from the remediation tool selected remediate the first file can be determined and launched on a computing device remote from the particular host device. Operations of the other remediation tool can be applied to resources of the particular host device to remediate the second file from the particular host device. Causing the operations to be applied to resources of the particular host device can include redirecting the operations to act on the resources of the particular host device. Such resources can include a memory block, file, or register of the particular host device. Operations can be redirected through an agent on the particular host device. The remediation tool can be one of a plurality of remediation tools that is determined as relevant for remediating the file and each of the remediation tools can be launched in a computing device remote from the host device while having the respective operations of each remediation tool applied to resources of the host device to remediate the file. In some instances, the plurality of remediation tools can be run in series. The file can be provided to the remediation tool or a virtual environment, such as a virtual machine on the computing device in which the remediation tool is to be executed. The remediation tool can be at least one of an anti-virus tool, an anti-spyware tool, and an antirootkit tool. Feedback data can be collected from the host devices regarding results of the operations of the remediation tool on the particular host device. Determining whether to use the remediation tool in response to a subsequent opportunity to remediate the file can be based at least in part on the feedback data.

Another general aspect of the subject matter described in this specification can be embodied in methods and executed instructions that include or cause the actions of identifying an opportunity to assist with remediation of a file at a remote particular host device, determining a remediation procedure for remediation of the file, and remotely initiating at least a portion of the remediation procedure to be performed locally at the particular host device.

Another general aspect of the subject matter described in this specification can be embodied in systems that include a processor device, memory element, and an antimalware support server. The antimalware support server can be configured to identify an opportunity to assist with remediation of a file at a remote particular host device, determine a remediation procedure for remediation of the file, and remotely initiate at least a portion of the remediation procedure to be performed locally at the particular host device.

These and other embodiments can each optionally include one or more of the following features. The opportunity can be identified based on a query from the particular host device for additional reputation information for the file. The request for remediation can be based on a determination at the host device that the file should be remediated. The determination of the host device can be in response to receiving reputation information for the file from an antimalware support system remote from the particular host device. Accordingly, a query can be received from the particular host device and response data can be returned in response to the query that includes the reputation information. The remediation procedure can include booting the particular host device and initiating the portion of the remediation procedure can include remotely booting the particular host device. Remotely booting the particular host device can cause the particular host device to launch with a tool provided through the booting and adapted to at least partially remediate the file. The remediation procedure can include a virtual machine image restore and initiating the portion of the remediation procedure can include remotely initiating the virtual machine image restore at the particular host device. Feedback data can be collected from the host devices regarding results of the portion of the remediation procedure on the particular host device. Determining a remediation procedure in response to a subsequent opportunity to remediate the file can be based at least in part on the feedback data. The remediation procedure can include a particular remediation procedure and be based at least in part on a combination of the particular host device and the file. A remediation procedure for a different file on the particular host device or the same file on another host device can be different from the particular remediation procedure. The remediation procedure can include a plurality of remediation tasks and the plurality of remediation tasks can include a first remediation task and a second remediation task and the second remediation task can be performed if the first remediation task is unsuccessful in remediating the file, among other examples and combinations of the above.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A non-transitory computer-readable medium comprising one or more instructions that when executed by a processor, cause the processor to:
   identify, at an antimalware support system, an opportunity to assist with remediation of a file at a host device remote from the antimalware support system;
   determine a remediation tool for remediation of the file;
   initiate, by the antimalware support system remote from the host device, at least a portion of the remediation tool to be performed locally at the host device, where operations of the at least a portion of the remediation tool performed locally are applied to resources of the host device; and
   receive feedback data at the antimalware support system from the host device identifying whether the at least a portion of the remediation tool performed locally remediated the file, wherein feedback data identifying that remediation of the file is incomplete causes the antimalware support system to apply another remediation tool to resources of the host device.

2. The non-transitory computer-readable medium of claim 1, wherein the operations of the at least a portion of the remediation tool performed locally act on the resources of the host device.

3. The non-transitory computer-readable medium of claim 2, wherein the resources include at least one of a memory block, file, or register of the host device.

4. The non-transitory computer-readable medium of claim 2, wherein the operations are applied through an agent on the host device.

5. The non-transitory computer-readable medium of claim 1, wherein the remediation tool is a first remediation tool, further comprising a second remediation tool.

6. The non-transitory computer-readable medium of claim 5, wherein the first and second remediation tools are defined to be run in series.

7. The non-transitory computer-readable medium of claim 1, wherein the instructions, when executed, further cause the processor to provide the file to the remediation tool.

8. The non-transitory computer-readable medium of claim 1, wherein the remediation tool is executed in a virtual environment.

9. The non-transitory computer-readable medium of claim 1, wherein determining whether to use the remediation tool in response to a subsequent opportunity to remediate the file is based at least in part on the feedback data.

10. The non-transitory computer-readable medium of claim 1, wherein the remediation tool is at least one of an anti-virus tool, an anti-spyware tool, and an antirootkit tool.

11. The non-transitory computer-readable medium of claim 1, wherein applying the operations of the remediation tool to the resources remediates the file from the host device.

12. The non-transitory computer-readable medium of claim 1, wherein the opportunity is identified based on a query from the host device for additional reputation information for the file.

13. The non-transitory computer-readable medium of claim 12, wherein the query prompts a determination by an antimalware support system remote from the host device that the file should be remediated.

14. The non-transitory computer-readable medium of claim 1, wherein identifying the opportunity includes receiving a request for remediation of the file from the host device.

15. The non-transitory computer-readable medium of claim 14, wherein the request for remediation is based on a determination at the host device that the file should be remediated.

16. The non-transitory computer-readable medium of claim 15, wherein the determination of the host device is in response to receiving reputation information for the file from an antimalware support system remote from the host device.

17. The non-transitory computer-readable medium of claim 16, wherein the instructions, when executed, further cause the processor to:
receive a query from the host device; and
return response data including the reputation information in response to the query.

18. The non-transitory computer-readable medium of claim 1, wherein another portion of the remediation tool is to be executed by the antimalware support system.

19. The non-transitory computer-readable medium of claim 18, wherein the remediation tool comprises a first remediation tool, and the instructions, when executed, further cause the processor to:
identify, at an antimalware support system, an opportunity to assist with remediation of the file at a second host device remote from the antimalware support system;
determine a second remediation tool for remediation of the file on the second host device, wherein the second remediation tool is different from the first remediation tool;
initiate, by the antimalware support system remote from the second host device, at least a portion of the second remediation tool to be performed locally at the second host device, wherein operations of the at least a portion of the second remediation tool performed locally are applied to resources of the second host device; and
receive feedback data at the antimalware support system from the second host device identifying whether the at least a portion of the second remediation tool performed locally remediated the file, wherein feedback data identifying that remediation of the file is incomplete causes the antimalware support system to apply another remediation tool to resources of the second host device.

20. The non-transitory computer-readable medium of claim 18, wherein the file comprises a first file, the remediation tool comprises a first remediation tool, and the instructions, when executed, further cause the processor to:
identify, at an antimalware support system, an opportunity to assist with remediation of a second file at the host device remote from the antimalware support system;
determine a second remediation tool for remediation of the second file on the host device, wherein the second remediation tool is different from the first remediation tool;
initiate, by the antimalware support system remote from the host device, at least a portion of the second remediation tool to be performed locally at the host device, wherein operations of the at least a portion of the second remediation tool performed locally are applied to resources of the host device; and
receive feedback data at the antimalware support system from the host device identifying whether the at least a portion of the second remediation tool performed locally remediated the second file, wherein feedback data identifying that remediation of the second file is incomplete causes the antimalware support system to apply another remediation tool to resources of the host device.

21. A method comprising:
identifying, at an antimalware support system, an opportunity to assist with remediation of a file at a host device remote from the antimalware support system;
determining a remediation tool for remediation of the file;
initiating, by the antimalware support system remote from the host device, at least a portion of the remediation tool to be performed locally at the host device, wherein operations of the at least a portion of the remediation tool performed locally are applied to resources of the host device; and
receiving feedback data at the antimalware support system from the host device identifying whether the at least a portion of the remediation tool performed locally remediated the file, wherein feedback data identifying that remediation of the file is incomplete causes the antimalware support system to apply another remediation tool to resources of the host device.

22. A system comprising:
at least one processor device;
at least one memory element; and
an antimalware support server adapted when executed by the at least one processor device to:
identify, at an antimalware support system, an opportunity to assist with remediation of a file at a host device remote from the antimalware support system;
determine a remediation tool for remediation of the file;
initiate, by the antimalware support system remote from the host device, at least a portion of the remediation tool to be performed locally at the host device, wherein operations of the at least a portion of the remediation tool performed locally are applied to resources of the host device; and
receive feedback data at the antimalware support system from the host device identifying whether the at least a portion of the remediation tool performed locally remediated the file, wherein feedback data identifying that remediation of the file is incomplete causes the antimalware support system to apply another remediation tool to resources of the host device.

* * * * *